(12) United States Patent
Atsuumi et al.

(10) Patent No.: US 6,388,792 B1
(45) Date of Patent: May 14, 2002

(54) OPTICAL SCANNING DEVICE AND IMAGE FORMING APPARATUS

(75) Inventors: Hiromichi Atsuumi; Seizo Suzuki; Magane Aoki, all of Kanagawa; Kohji Sakai, Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/612,634

(22) Filed: Jul. 7, 2000

(30) Foreign Application Priority Data

Jul. 9, 1999 (JP) ............................................. 11-196448

(51) Int. Cl.$^7$ ............................................. G02B 26/08
(52) U.S. Cl. ...................... 359/207; 359/205; 359/206; 359/204; 347/223; 347/244; 347/259
(58) Field of Search ........................ 359/204, 205–207, 359/216–219, 212; 347/233, 241–244, 258–261, 238

(56) References Cited

U.S. PATENT DOCUMENTS

| | | | |
|---|---|---|---|
| 5,475,522 A | 12/1995 | Itabashi et al. | |
| 5,546,216 A | 8/1996 | Suzuki | |
| 5,684,618 A | 11/1997 | Atsuumi | |
| 5,717,511 A | 2/1998 | Suzuki | |
| 5,737,112 A | * 4/1998 | Iizuka | 359/205 |
| 5,805,199 A | 9/1998 | Aoki | |
| 5,831,758 A | * 11/1998 | Sakai et al. | 359/204 |
| 5,875,051 A | 2/1999 | Suzuki et la. | |
| 5,970,034 A | 10/1999 | Sakuma et al. | |
| 5,986,791 A | 11/1999 | Suzuki et al. | |
| 5,999,345 A | 12/1999 | Nakajima et al. | |
| 6,069,723 A | 5/2000 | Aoki | |
| 6,078,419 A | 6/2000 | Atsuumi | |

* cited by examiner

Primary Examiner—James Phan
(74) Attorney, Agent, or Firm—Oblon, Spivak, McClelland, Maier & Neustadt, P.C.

(57) ABSTRACT

An optical scanning device deflects one or a plurality of light flux(es) originating from a light source by an optical deflecting unit, gathers the deflected light flux(es) to cause it(them) to form a beam spot(s) on a surface to be scanned by a scanning and image-forming optical system, and, thus, performs optical scanning of the surface to be scanned. The scanning and image-forming optical system includes one or a plurality of optical component(s) including a lens. At least one surface of the lens included in the scanning and image-forming optical system is a sub-non-arc surface having an arc or non-arc shape in a main scanning plane, and a non-arc shape in a sub-scanning plane. The sub-non-arc surface is formed in a lens in which a diameter of a light flux passing through the scanning and image-forming optical system is largest in the sub-scanning plane'.

42 Claims, 14 Drawing Sheets

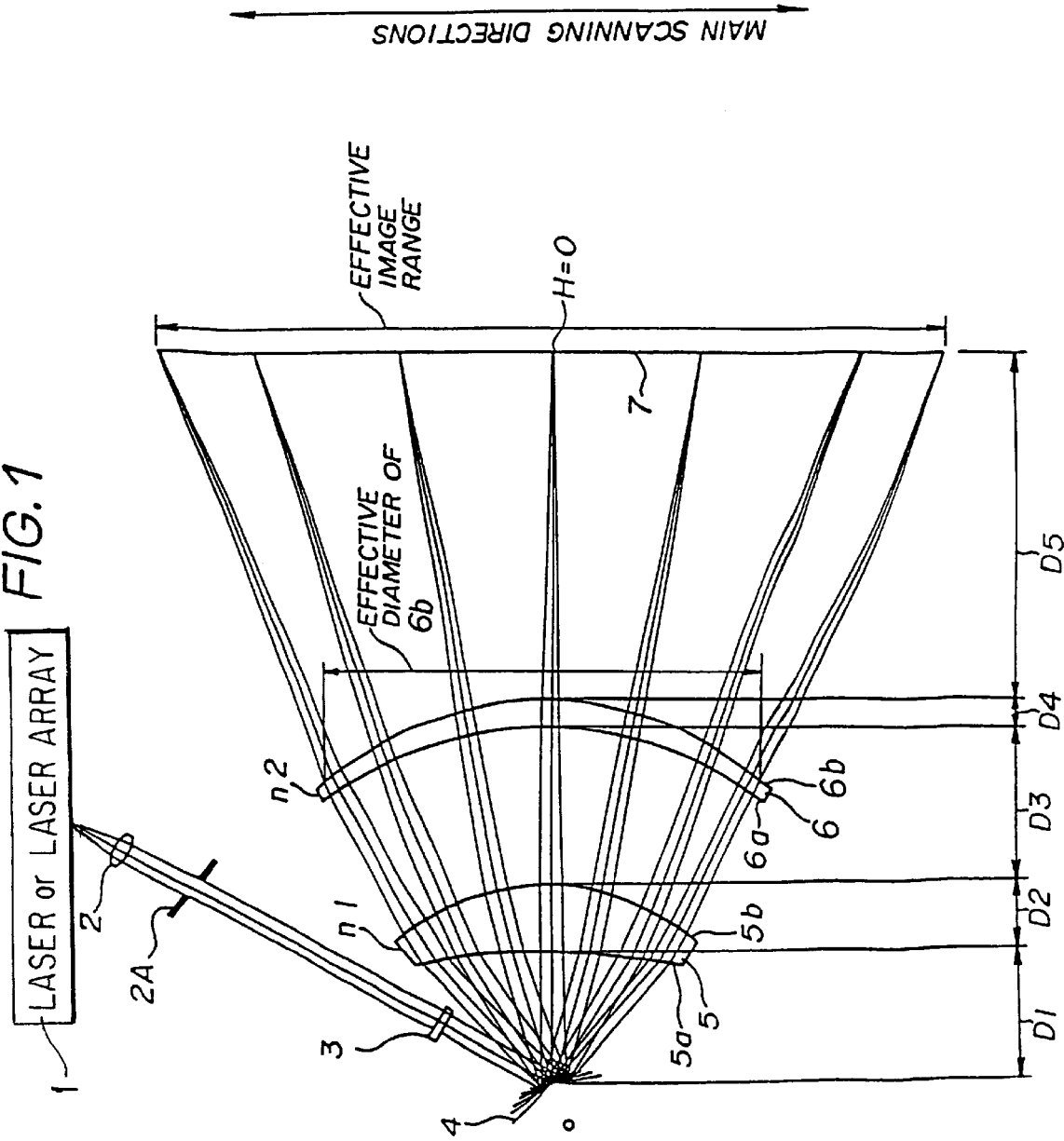

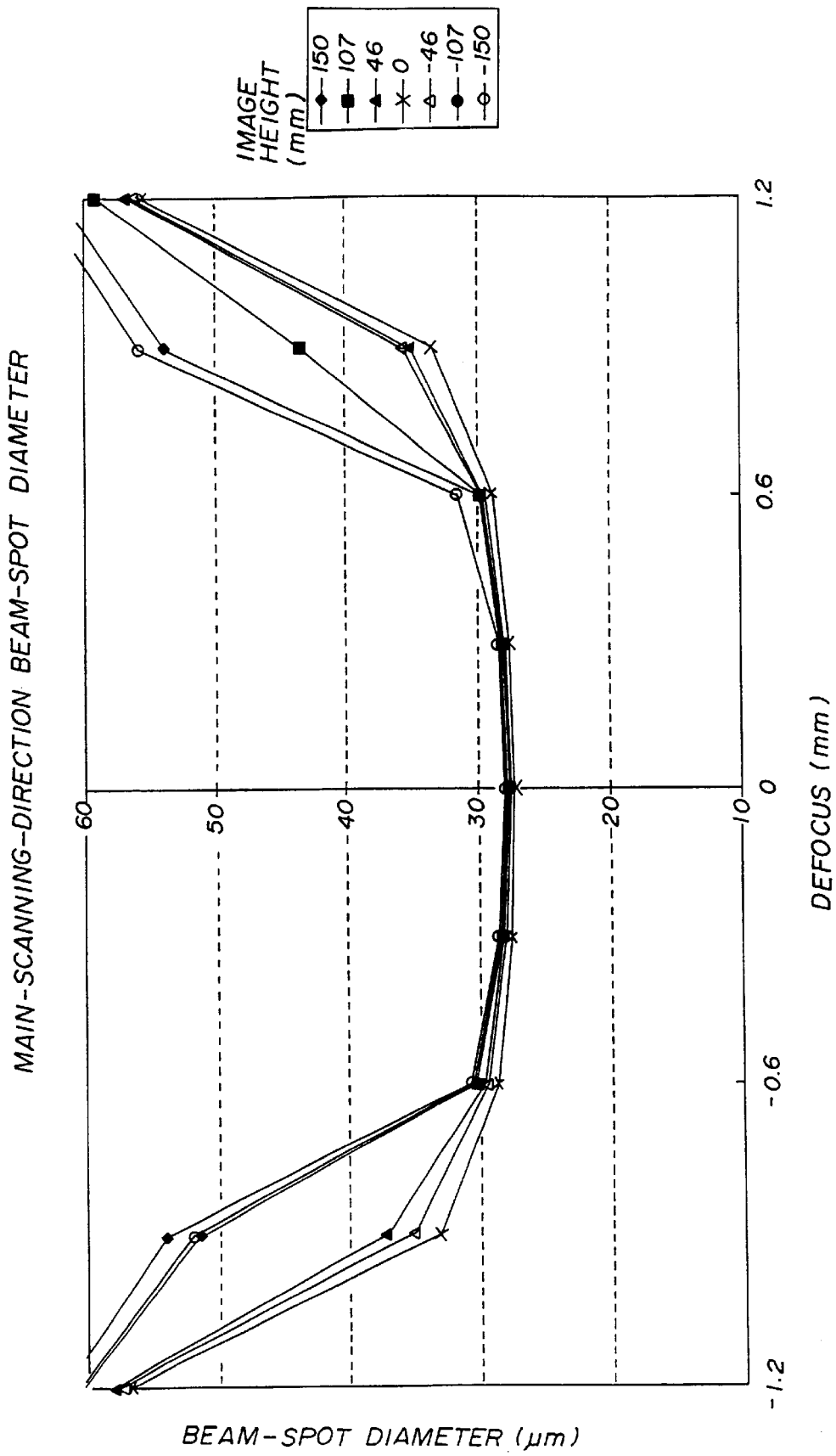

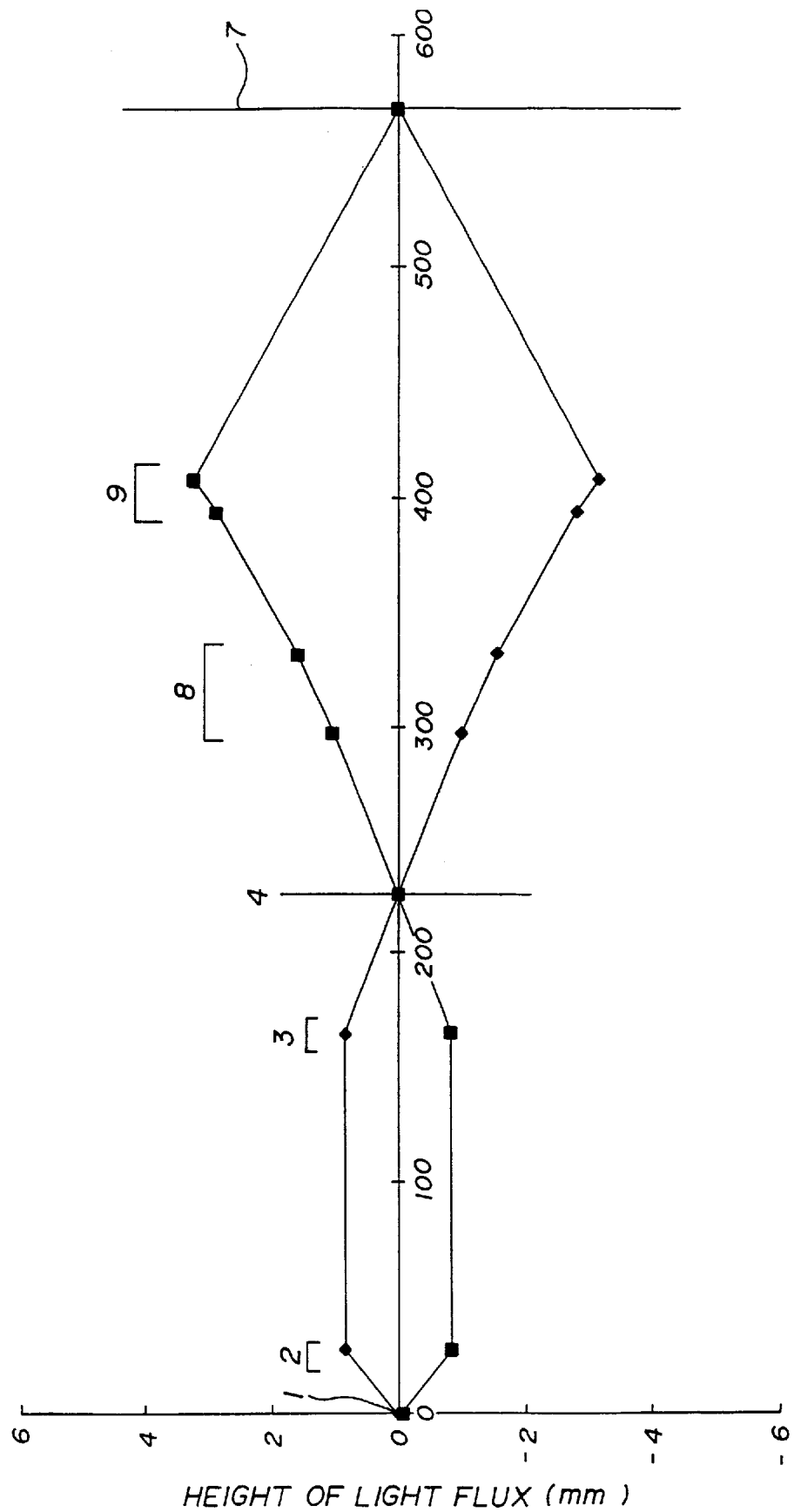

OPTICAL SCANNING DEVICE AND IMAGE FORMING APPARATUS

BACKGROUND OF THE INVENTION

1. Field of the Invention

The present invention generally relates to an optical scanning device and an image forming apparatus.

2. Description of the Related Art

Optical scanning devices are widely used in 'image forming apparatus' such as a digital copier, an optical printer, an optical plate-making machine, a facsimile machine and so forth. A writing density of optical scanning devices has been increased to 1200 dpi, 1600 dpi, and is intended to be increased, further higher.

In order to achieve such high-density writing, it is necessary to form a beam spot having a small diameter, and, also, quality and stability of a beam spot is needed to be improved. Stability of a beam spot is determined from determining whether or not 'a variation in a beam-spot diameter on a surface to be scanned due to a variation in an image height' is very small and stable. Quality of a beam spot is determined from determining whether or not 'the light-intensity distribution of a beam spot has a simple mountain shape and does not have a complicated lower slope shape'.

In order to achieve a beam spot having high-quality and stability, it is necessary for a scanning and image-forming optical system of an optical scanning device to have a high performance for forming a beam spot on a surface to be scanned using a deflected light flux. A factor causing a beam-spot diameter to fluctuate is, as is well known, 'curvature of field in a scanning and image-forming optical system', and many scanning and image-forming optical systems in which curvature of field is well corrected have been proposed. Further, it is important for an optical magnification in a scanning and image-forming optical system to be fixed when an image height of a beam spot changes.

However, in order to form a beam spot having stability and high quality, not only it is necessary to correct an optical performance such as curvature of field and an optical magnification but also it is important to 'set a wave-optical wavefront aberration to be fixed between respective image heights'.

SUMMARY OF THE INVENTION

An object of the present invention is to achieve high-density, satisfactory optical scanning with a stable and high-quality beam spot, by well correcting not only curvature of field and optical magnification but also 'wavefront aberration on pupil' in a scanning and image-forming optical system.

An optical scanning device according to the present invention is 'a device which deflects one or a plurality of light flux(es) originating from a light source by an optical deflecting unit, gathers the deflected light flux(es) to cause it (them) to form a beam spot(s) on a surface to be scanned by a scanning and image-forming optical system, and, thus, performs optical scanning of the surface to be scanned'.

As one or a plurality of light flux(es) is (are) emitted from the light source, the optical scanning device according to the present invention can be put in to practice either as an optical scanning device in a single-beam-scanning system in which optical scanning is performed using a single beam spot or an optical scanning device in a multi-beam-scanning system in which a plurality of scan lines are scanned simultaneously by a plurality of beam spots.

The scanning and image-forming optical system includes one or a plurality of optical component(s) including a lens. Accordingly, the scanning and image-forming optical system may include, other than the lens, 'a reflecting-surface component having a mirror surface having an image-forming function'.

Further, at least one surface of the lens included in the scanning and image-forming optical system is a sub-non-arc surface.

The 'sub-non-arc surface' is a surface having an arc or non-arc shape in a main scanning plane, and having a non-arc shape in a sub-scanning plane.

The 'main scanning plane' is a plane including the optical axis of the lens and parallel to main scanning directions in the lens or in the vicinity thereof.

The 'sub-scanning plane' is a plane perpendicular to the main scanning directions in the lens or in the vicinity thereof.

The optical scanning device according to the present invention is characterized in that the sub-non-arc surface is formed in 'a lens in which a diameter of a light flux passing through the scanning and image-forming optical system is largest in the sub-scanning plane'.

That is, when the scanning and image-forming optical system has 'one sub-non-arc surface', this sub-non-arc surface is formed in the above-mentioned 'lens in which the diameter of the light flux passing through the scanning and image-forming optical system is largest in the sub-scanning plane', and, when the scanning and image-forming optical system has two or more sub-non-arc surfaces, at least one thereof is provided in the above-mentioned 'lens in which the diameter of the light flux passing through the scanning and image-forming optical system is largest in the sub-scanning plane'. In this case, both the surfaces of this lens may be sub-non-arc surfaces.

In this optical scanning device, the sub-non-arc surface may be a surface of the 'lens in which the diameter of the light flux passing through the scanning and image-forming optical system is largest in the sub-scanning plane', 'in which surface a diameter of the light flux passing through the scanning and image-forming optical system is largest in the sub-scanning plane'.

The optical scanning device according to another aspect of the present invention is characterized in that a sub-non-arc surface is formed in 'a lens having the largest effective diameter in the main scanning plane'.

In this case, the sub-non-arc surface may be a surface of the lens, which surface has the largest effective diameter in the main scanning plane'.

Degradation in wavefront aberration is likely to occur as a wave surface is large. Accordingly, a surface of a lens through which correction of wavefront aberration can be effectively made is a portion at which a wave surface is large, and, therefore, a surface of each of the above-mentioned lenses or each of the above-mentioned surfaces of the lenses is suitable for having a sub-non-arc surface through which wavefront aberration is corrected. Further, in such a portion as that in which a wave surface is large, a sub-non-arc surface itself is large, and, thereby, it is easy to form the sub-non-arc surface.

The optical scanning device according to another aspect of the present invention is characterized in that the sub-non-arc is formed in 'a lens of a scanning and image-forming optical system having a surface in which, throughout an effective range of the lens, the incidence angle of the chief ray of a deflected light flux incident on the respective surfaces of the lens is equal to or less than 25 degrees'.

In this case, a 'surface of the lens, in which surface, in which, throughout the effective range of the lens, the incidence angle of the chief ray of a deflected light flux incident on the respective surfaces of the lens is equal to or less than 25 degrees' may be formed to be the sub-non-arc surface.

In a surface in which the incidence angle is larger than 25 degrees, a refractive index of this surface in a main scanning plane is large. When such a surface is formed to be the sub-non-arc surface, it is not necessarily easy to achieve both an effect of correction of wavefront aberration in the sub-scanning directions and an effect of correction of characteristics in the main scanning directions. Accordingly, it is preferable for a 'surface, in which the incidence angle of the chief ray of a deflected light flux is equal to or less than 25 degrees throughout an effective range of the lens', to be the sub-non-arc surface.

The optical scanning device according to another aspect of the present invention is characterized in that the sub-non-arc surface expressed by a coordinate X(Y, Z) in the optical-axis direction is expressed by the following equation:

$$X(Y, Z) = CmY^2/[1+\sqrt{\{1-(1+K)Cm^2Y^2\}}]+\Sigma A_n Y^n + Cs(Y)Z^2/[1+\sqrt{\{1-(1+Kz(Y))Cs^2(Y)Z^2\}}]+f_{SAG}(Y, Z) \quad (1)$$

where 'Y' denotes a coordinate in the main scanning direction, 'Z' denotes a coordinate in the sub-scanning direction, 'Cm' denotes a paraxial curvature in the main scanning directions on the optical axis or in the vicinity thereof, 'Cs(0)' denotes a paraxial curvature in the sub-scanning directions on the optical axis or in the vicinity thereof, 'Cs(Y)' denotes a curvature in the sub-scanning plane at a coordinate Y in the main scanning direction, 'K' denotes a conical constant of a quadric curve in the main scanning plane on the optical axis, 'Kz(Y)' denotes a conical constant of a quadric curve in the sub-scanning plane at a coordinate Y in the main scanning direction, and '$f_{SAG}(Y, Z)$' denotes a non-spherical-surface high-order correction amount.

The sum of the second term is taken for n from n=1 to n=p (desired order number).

In this optical scanning device, the above-mentioned curvature Cs(Y) can be expressed by the following equation:

$$Cs(Y) = \{1/Rs(0)\} + B_1 Y + B_2 Y^2 + B_3 Y^3 + B_4 Y^4 + \ldots \quad (2)$$

using a radius Rs(0) of paraxial curvature in the sub-scanning plane on the optical axis or in the vicinity thereof, and constant coefficients $B_1$, $B_2$, $B_3$, . . . .

Further, in the above-mentioned optical scanning device, the above-mentioned conical constant Kz(Y) can be expressed by the following equation:

$$Kz(Y) = C_0 + C_1 Y + C_2 Y^2 + C_3 Y^3 + C_4 Y^4 + \ldots \quad (3)$$

using constant coefficients $C_0$, $C_1$, $C_2$, $C_3$, . . . .

Furthermore, in the above-mentioned optical scanning device, the above-mentioned high-order correction amount $f_{SAG}(Y, Z)$ can be expressed by the following equation $$f_{SAG}(Y, Z) = \Sigma(\Sigma d_{j, h} Y^h) Z^j \quad (4)$$

using constant coefficients $d_{j, h}$.

The sum of the right side is taken for h from h=0 to h=q (desired order), and for j, j=1 to j=r (desired order).

In each of the above-mentioned optical scanning devices, it is possible for the optical deflecting unit to be 'a unit (polygon mirror, rotational single-surface mirror, rotational two-surface mirror or the like) which deflects a light flux(es) originating from the light source at a uniform angular velocity', and for the scanning and image-forming optical system to be 'a system having a function of making a velocity of optical scanning by the light flux(es) deflected at the uniform angular velocity be uniform'.

Further, in each of the above-mentioned optical scanning devices, the lens of the scanning and image-forming optical system having the sub-non-arc surface may be made of 'a plastic material'. For manufacturing a lens having a complicated shape such as that of the sub-non-arc surface, molding of a plastic material is suitable, and, thereby, it is possible to reduce the cost.

Each of the above-mentioned optical scanning devices may be of a multi-beam-scanning system in which a plurality of light fluxes are emitted from the light source, are gathered to form a plurality of beam spots on the surface to be scanned by the scanning and image-forming optical system, a plurality of scan lines on the surface to be scanned are scanned simultaneously by the plurality of beam spots.

Each of the above-mentioned optical scanning devices may be of a single-beam-scanning system in which a single light flux is emitted from the light source, is gathered to form a beam spot on the surface to be scanned by the scanning and image-forming optical system, a single scan line on the surface to be scanned is scanned by the beam spot at each scanning.

The above-mentioned optical scanning device of the multi-beam-scanning system may be configured 'to couple the plurality of light fluxes from the light source by a coupling lens, cause the thus-obtained light fluxes to form line images each extending in the main scanning directions on a deflection reflective surface of the optical deflecting unit or in the vicinity thereof by a line-image forming optical system common to the respective light fluxes, then reflect and deflect the light fluxes at a uniform angular velocity by the optical deflecting unit, gather the reflected and deflected light fluxes so as to cause them to form a plurality of beam spots separate in the sub-scanning directions, and scan the plurality of scan lines on the surface to be scanned simultaneously using the plurality of beam spots.

In such an optical scanning device of the multi-beam-scanning system, 'a monolithic semiconductor laser array in which a plurality of light-emitting sources are arranged in a line' may be used as the light source which emits a plurality of light fluxes.

An image forming apparatus according to the present invention is 'an image forming apparatus in which a latent image is formed on a latent-image carrying body by optical scanning, the thus-formed latent image is developed, and, thereby, a desired image is obtained'. In the image forming apparatus, as an optical scanning device for performing the optical scanning of the latent-image carrying body, any of the above-mentioned optical scanning devices is used.

In this case, the image forming apparatus may be arranged in a manner such that a photoconductive photosensitive body is used as the latent-image carrying body, a formed latent image is visualized as a toner image, the toner image is transferred and fixed onto a sheet-like recording medium (transfer paper, a plastic sheet for an overhead projector, or the like), and, thus, a desired image is obtained.

Alternatively, for example, a silver photographic film may be used as the latent-image carrying body. In this case, a latent image formed by optical scanning by the optical scanning device can be visualized by a developing method of a normal silver photographic process. Such an image forming apparatus can be put into practice as an 'optical plate-making machine', for example.

The above-mentioned image forming apparatus in which the photoconductive photosensitive body is used as the latent-image carrying body can be put into practice as a laser printer, a laser plotter, a digital copier, a facsimile machine, or the like.

As described above, according to the present invention, it is possible to achieve novel optical scanning devices and image forming apparatuses. In an optical scanning device according to the present invention, as described above, a 'sub-non-arc surface(s)' is (are) formed in a lens(es) included in the scanning and image-forming optical system, and, thereby, not only image-surface curvature and optical magnification, but also wavefront aberration are well corrected. Thereby, it is possible to achieve high-density, satisfactory optical scanning using a stable, satisfactory beam spot. Further, in an image forming apparatus according to the present invention, because the above-mentioned optical scanning device is used, it is possible to achieve satisfactory image formation.

Other objects and further features of the present invention will become more apparent from the following detailed description when read in conjunction with the accompanying drawings.

BRIEF DESCRIPTION OF THE DRAWINGS

FIG. 1 is a schematic drawing illustrating a construction of an optical scanning device in a first embodiment of the present invention;

FIGS. 2A and 2B show depth curves in the first embodiment;

FIG. 9 shows change in a diameter of a light flux in the sub-scanning directions along a light path in the second embodiment;

DETAILED DESCRIPTION OF THE PREFERRED EMBODIMENTS

Figure 2B:
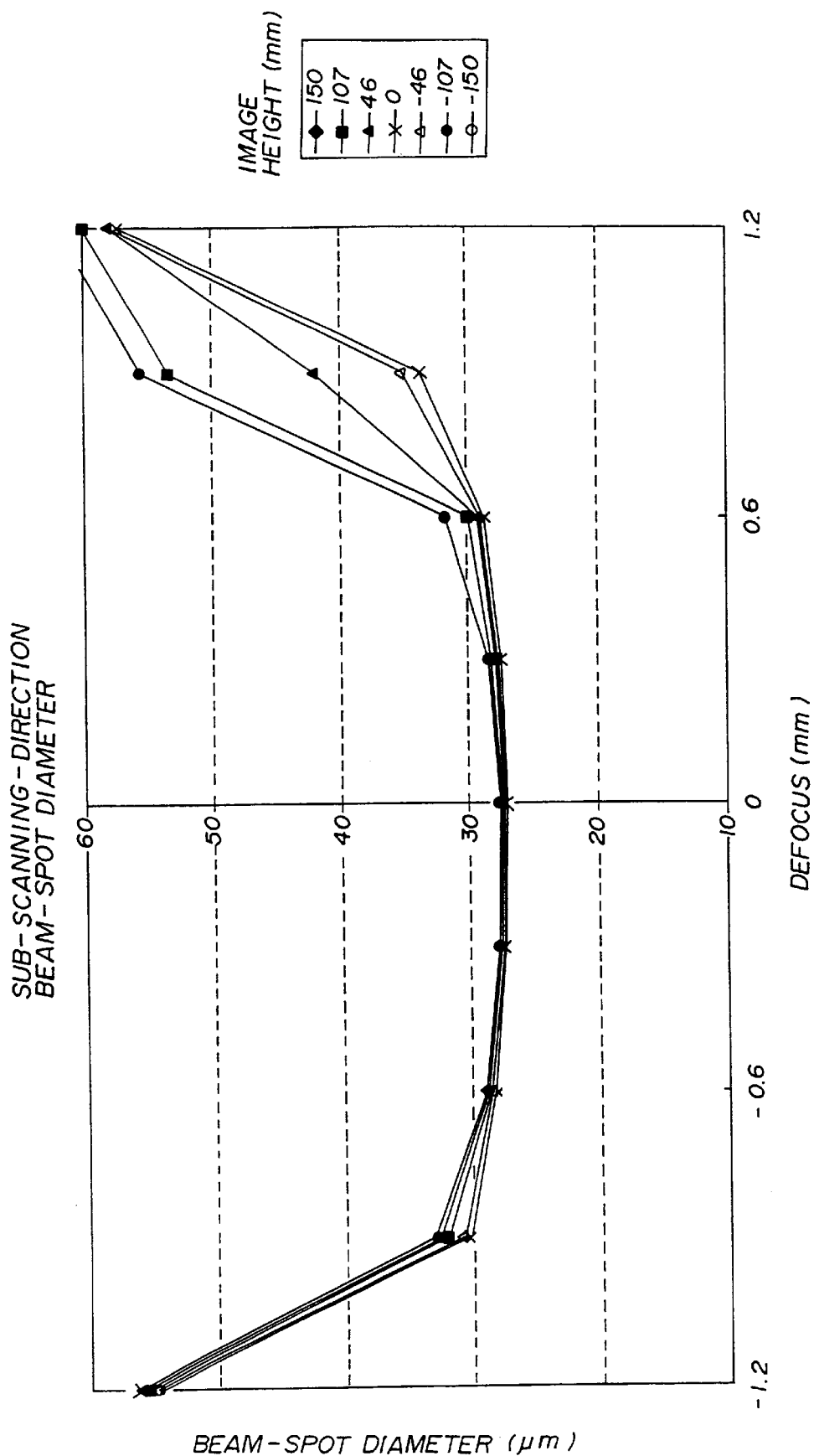

FIG. 1 shows a first embodiment of an optical scanning device according to the present invention.

A light flux(es) emitted from a light source 1 is transformed into one(s) (parallel light flux(es), convergent light flux(es), divergent light flux(es) or the like) in a light-flux form suitable for following optical systems by a coupling lens 2, then, undergoes beam shaping by an aperture 2A, is (are) converged in the sub-scanning directions (directions perpendicular to FIG. 1) by a cylindrical lens 3 which is a 'line-image image-forming optical system', and, thus, forms a line image(s) extending in the main scanning directions on a deflection reflective surface of a polygon mirror 4 which is an 'optical deflecting unit' or in the vicinity thereof.

The light flux(es) is (are) deflected by the deflection reflective surface at a uniform angular velocity due to uniform-velocity rotation of the polygon mirror 4 (FIG. 1 showing a state of rotation of the deflection reflective surface of the polygon mirror 4 due to the rotation of the polygon mirror 4 and the deflected light flux(es) corresponding to each position of the deflection reflective surface), then, passes through lenses 5 and 6, and, by functions of the lenses 5 and 6, is gathered so as to form a beam spot on a surface 7 to be scanned (actually, a photosensitive surface of a photoconductive photosensitive body or the like), then, optically scanning the surface 7 to be scanned.

Figure 7:
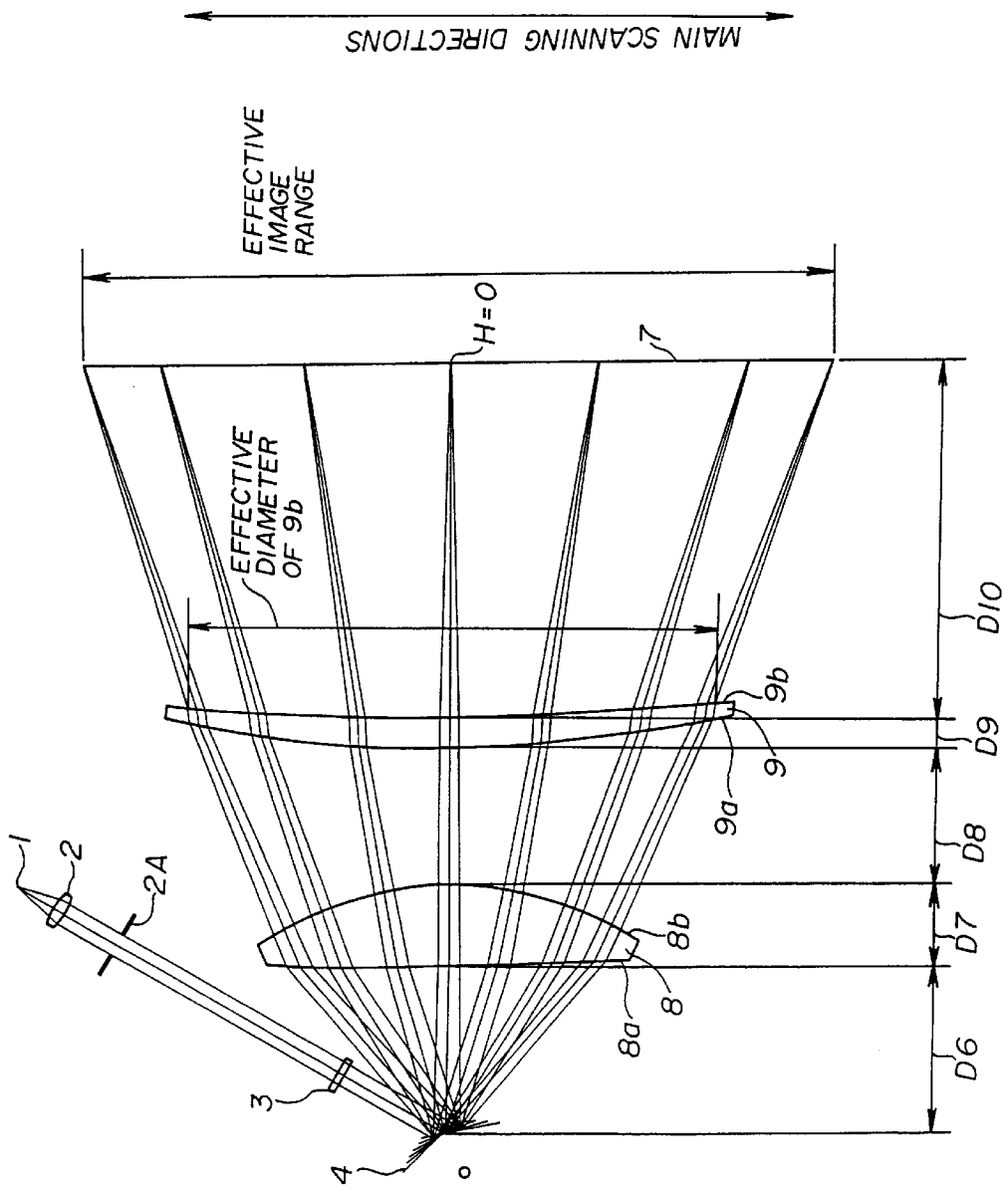
FIG. 7 is schematic drawing illustrating a construction of an optical scanning device in a second embodiment of the present invention.

FIG. 7 shows a second embodiment of the present invention in the same manner in which the first embodiment is shown in FIG. 1. In this embodiment, the scanning and image-forming optical system includes two lenses 8 and 9.

In each of the embodiments shown in FIGS. 1 and 7, as the light source 1, a 'semiconductor laser having a single light-emitting source' or the above-described 'semiconductor laser array' can be used preferably. When the semiconductor laser is used as the light source 1, the light-emitting source thereof is positioned on the optical axis of the coupling lens 2. When the semiconductor laser array is used as the light source 1, the plurality of light-emitting sources thereof are 'perpendicular' to or 'inclined' from the main scanning directions (directions parallel to each of FIGS. 1 and 7), so that a plurality of beam spots formed on the surface 7 to be scanned are separate at desired intervals in the sub-scanning directions. In this case, the plurality of light-emitting sources are arranged in a manner such that they are symmetrical about the optical axis of the coupling lens 2.

In each of the first and second embodiments, the arrangement from the light source 1 to the polygon mirror 4 is common, and, therefore, 'data of the common portion' will now be described.

For example, the light source 1 is 'a semiconductor array', having four light-emitting sources which are arranged with a pitch of 14 $\mu$m, a wavelength of light emitted from each light-emitting source being 780 nm. These four light-emitting sources are arranged in the directions (sub-scanning directions) perpendicular to each of FIGS. 1 and 7 in a manner such that the four light-emitting sources are symmetric about the optical axis of the coupling lens 2.

The coupling lens 2 has the focal length of 27 mm, and has a 'collimating function' of transforming four light fluxes from the light source 1 into 'parallel light fluxes', respectively. Accordingly, each of the four light fluxes coupled by the coupling lens 2 is the parallel light flux.

The cylindrical lens 3 has the focal length in the sub-scanning directions of 58.69 mm.

The polygon mirror 4 has five deflection reflective surfaces, the radius of the inscribed circle of which is 20 mm, an angle of 60 degrees is formed by projections onto the main scanning plane of the chief ray of each light flux from the light source 1 and the optical axis of the scanning and image-forming optical system. The cylindrical lens 3 is placed at a position '58.69 mm' away toward the light source 1 from the starting-point position of the deflection at a time each deflected light flux is parallel to the optical axis of the scanning and image-forming optical system 'viewed from the sub-scanning direction'.

The optical scanning thereby is 'adjacent scanning' by a multi-beam scanning method using 4 light fluxes, and the resulting writing density is 1200 dpi.

Specification of the surfaces of the lenses will now be described. A shape of each sub-non-arc surface is in accordance with the above-described equations (1) through (4). That is, for specifying the shape of each sub-non-arc surface, 'Cm (paraxial curvature in the main scanning directions)', 'Cs(0) (paraxial curvature in the sub-scanning directions on the optical axis or in the vicinity thereof)' and so forth in the equation (1) are determined. It is noted that Cm is the reciprocal of Rm, that is, $$Cm = 1/Rm$$

Cs(Y) is obtained from the following equation:

$$Cs(Y) = \{1/Rs(0)\} + B_1 Y + B_2 Y^2 + B_3 Y^3 + B_4 Y^4 + \ldots \quad (6)$$

and the radius Rs(0) of sub-scanning curvature on the optical axis and coefficients $B_1$, $B_2$, and so forth are determined therefor. It is noted that Rs(0) is equal to Rs, that is, $$Rs(0) = Rs$$

In the equation (6), when any one of the odd-number power coefficients $B_1$, $B_3$, $B_5$, ... has a value other than 0, the sub-scanning curvature is asymmetrical in the main scanning directions.

Further, the non-spherical-surface high-order correction amount $f_{SAG}(Y, Z)$ is expanded as follows:

$$f_{SAG}(Y, Z) = (F_0 + F_1 \cdot Y + F_2 \cdot Y^2 + F_3 \cdot Y^3 + F_4 \cdot Y^4 + \ldots)$$
$$\cdot Z + (G_0 + G_1 \cdot Y + G_2 \cdot Y^2 + G_3 \cdot Y^3 + G_4 \cdot Y^4 + \ldots)$$
$$\cdot Z^2 + (H_0 + H_1 \cdot Y + H_2 \cdot Y^2 + H_3 \cdot Y^3 + H_4 \cdot Y^4 + \ldots)$$
$$\cdot Z^3 + (I_0 + I_1 \cdot Y + I_2 \cdot Y^2 + I_3 \cdot Y^3 + I_4 \cdot Y^4 + \ldots)$$
$$\cdot Z^4 + (J_0 + J_1 \cdot Y + J_2 \cdot Y^2 + J_3 \cdot Y^3 + J_4 \cdot Y^4 + \ldots)$$
$$\cdot Z^5 + \ldots$$

and constant coefficients $F_0$, $F_1$, ..., and so forth (the constant coefficients $d_{j,h}$ in the equation (4)) are determined for specifying the non-spherical-surface high-order correction amount $f_{SAG}(Y, Z)$.

The non-arc shape in the main scanning plane of each sub-non-arc surface is expressed by the following polynominal:

$$X = (Y^2/Rm)/[1 + \sqrt{\{1-(1+K)(Y/Rm)^2\}}] + A_1 Y + A_2 Y^2 + A_3 Y^3 + A_4 Y^4 + A_5 Y^5 + \ldots \quad (5)$$

where Rm denotes a radius of paraxial curvature in the main scanning plane on the optical axis, Y denotes a distance from the optical axis along the main scanning direction, K denotes a conical constant, $A_1$, $A_2$, $A_3$, ... denote high-order coefficients, and X denotes a depth in the optical-axis direction.

In this equation, when at least one of the odd-number-order coefficients has a value other than 0, the non-arc shape is asymmetrical in the main scanning directions. The equation (5) is obtained as a result of the first and second terms of the right side of the equation (1) being rewritten.

The first embodiment will now be described.

In FIG. 1, data of the optical components on the optical path from the polygon mirror 4 to the surface 7 to be scanned is as follows:

| | SURFACE NUMBER | R m (mm) | R s (mm) | X (mm) | Y (mm) | n |
|---|---|---|---|---|---|---|
| DEFLECTION REFLECTIVE SURFACE | 0 | ∞ | ∞ | 55.84 (D1) | | |
| LENS 5 | 1 | −309.83 | −42.49 | 30.94 (D2) | 0.225 | 1.52398 |
| | 2 | −81.44 | −3654.71 | 69.52 (D3) | | |
| LENS 6 | 3 | −129.99 | 119.29 | 10.71 (D4) | 0.227 | 1.52398 |
| | 4 | −151.53 | −50.75 | 149.20 (D5) | | |

The surface numbers 1, 2, 3 and 4 correspond to the surfaces 5a, 5b, 6a and 6b of the lenses 5 and 6 shown in FIG. 1, respectively, 'X' denotes an interval indicated as D1 through D5 in FIG. 1, 'Y' denotes a shift amount of the lens (from a reference line, regarding the projection onto the main scanning plane of the chief ray of each light flux reflected by the deflection reflective surface in the direction toward the point on the surface 7 to be scanned at which the image height (H) is 0 as the reference line, and the upper side in FIG. 1 as positive, accordingly it being able to be seen from the above data that each of the lenses 5 and 6 is shifted upward in FIG. 1), and 'n' denotes the refractive index of the lens. In order to specify the shapes of the surfaces of the lenses 5 and 6, the respective coefficients are shown in Tables 1 through 3.

TABLE 1

| SURFACE NUMBER | | COEFFICIENT FOR MAIN SCANNING DIRECTIONS | | COEFFICIENT FOR SUB-SCANNING DIRECTIONS | |
|---|---|---|---|---|---|
| 1 | K | 4.151 | $B_1$ | 0 | |
| | $A_1$ | 0 | $B_2$ | −1.752 × 10$^{-5}$ | |
| | $A_2$ | 0 | $B_3$ | 0 | |
| | $A_3$ | 0 | $B_4$ | −4.463 × 10$^{-9}$ | |
| | $A_4$ | −9.907 × 10$^{-9}$ | $B_5$ | 0 | |
| | $A_5$ | 0 | $B_6$ | 7.221 × 10$^{-13}$ | |
| | $A_6$ | 3.315 × 10$^{-12}$ | $B_7$ | 0 | |
| | $A_7$ | 0 | $B_8$ | −9.163 × 10$^{-18}$ | |
| | $A_8$ | −2.119 × 10$^{-17}$ | $B_9$ | 0 | |
| | $A_9$ | 0 | $B_{10}$ | 2.357 × 10$^{-20}$ | |
| | $A_{10}$ | 1.332 × 10$^{-20}$ | $B_{11}$ | 0 | |
| 2 | K | −6.992 × 10$^{-1}$ | $B_1$ | 1.735 × 10$^{-5}$ | |
| | $A_1$ | 0 | $B_2$ | −1.250 × 10$^{-6}$ | |
| | $A_2$ | 0 | $B_3$ | 1.141 × 10$^{-10}$ | |
| | $A_3$ | 0 | $B_4$ | −2.423 × 10$^{-9}$ | |
| | $A_4$ | −4.763 × 10$^{-8}$ | $B_5$ | 6.998 × 10$^{-13}$ | |
| | $A_5$ | 0 | $B_6$ | −2.557 × 10$^{-14}$ | |
| | $A_6$ | −3.446 × 10$^{-12}$ | $B_7$ | −4.699 × 10$^{-16}$ | |
| | $A_7$ | 0 | $B_8$ | −1.383 × 10$^{-15}$ | |
| | $A_8$ | 1.729 × 10$^{-15}$ | $B_9$ | 1.227 × 10$^{-19}$ | |
| | $A_9$ | 0 | $B_{10}$ | 2.812 × 10$^{-20}$ | |
| | $A_{10}$ | 2.698 × 10-20 | $B_{11}$ | 0 | |

TABLE 2

| SURFACE NUMBER | COEFFICIENT FOR MAIN SCANNING DIRECTIONS | | COEFFICIENT FOR SUB-SCANNING DIRECTIONS | |
|---|---|---|---|---|
| 3 | K | $-9.740 \times 10^{-1}$ | $B_1$ | $2.764 \times 10^{-6}$ |
|  | $A_1$ | 0 | $B_2$ | $2.283 \times 10^{-6}$ |
|  | $A_2$ | 0 | $B_3$ | $1.729 \times 10^{-11}$ |
|  | $A_3$ | 0 | $B_4$ | $-2.528 \times 10^{-10}$ |
|  | $A_4$ | $-4.422 \times 10^{-8}$ | $B_5$ | $-6.030 \times 10^{-14}$ |
|  | $A_5$ | 0 | $B_6$ | $-7.846 \times 10^{-15}$ |
|  | $A_6$ | $7.758 \times 10^{-13}$ | $B_7$ | $3.024 \times 10^{-17}$ |
|  | $A_7$ | 0 | $B_8$ | $-1.882 \times 10^{-19}$ |
|  | $A_8$ | $1.066 \times 10^{-16}$ | $B_9$ | $-6.466 \times 10^{-21}$ |
|  | $A_9$ | 0 | $B_{10}$ | $9.925 \times 10^{-23}$ |
|  | $A_{10}$ | $1.248 \times 10^{-20}$ | $B_{11}$ | $6.647 \times 10^{-25}$ |
|  | $A_{11}$ | 0 | $B_{12}$ | $-9.070 \times 10^{-27}$ |
|  | $A_{12}$ | $7.019 \times 10^{-25}$ | $B_{13}$ | $-2.589 \times 10^{-29}$ |
|  | $A_{13}$ | 0 | $B_{14}$ | $3.261 \times 10^{-31}$ |
|  | $A_{14}$ | $-7.044 \times 10^{-29}$ | $B_{15}$ | 0 |
| 4 | K | $1.212 \times 10^{-1}$ | $B_1$ | 0 |
|  | $A_1$ | 0 | $B_2$ | $1.476 \times 10^{-6}$ |
|  | $A_2$ | 0 | $B_3$ | 0 |
|  | $A_3$ | 0 | $B_4$ | $-2.095 \times 10^{-10}$ |
|  | $A_4$ | $-6.500 \times 10^{-8}$ | $B_5$ | 0 |
|  | $A_5$ | 0 | $B_6$ | $-4.770 \times 10^{-15}$ |
|  | $A_6$ | $1.061 \times 10^{-12}$ | $B_7$ | 0 |
|  | $A_7$ | 0 | $B_8$ | $7.381 \times 10^{-20}$ |
|  | $A_8$ | $-1.725 \times 10^{-16}$ | $B_9$ | 0 |
|  | $A_9$ | 0 | $B_{10}$ | $-4.739 \times 10^{-24}$ |
|  | $A_{10}$ | $1.004 \times 10^{-20}$ | $B_{11}$ | 0 |
|  | $A_{11}$ | 0 | $B_{12}$ | $-4.706 \times 10^{-27}$ |
|  | $A_{12}$ | $-1.004 \times 10^{-25}$ | $B_{13}$ | 0 |
|  | $A_{13}$ | 0 | $B_{14}$ | $1.073 \times 10^{-31}$ |
|  | $A_{14}$ | $3.753 \times 10^{-29}$ | $B_{15}$ | 0 |

TABLE 3

| 4 | $C_0$ | $-7.256 \times 10^{-1}$ | $I_0$ | $1.034 \times 10^{-6}$ | $K_0$ | $1.988 \times 10^{-10}$ |
|---|---|---|---|---|---|---|
|  | $C_1$ | $-2.340 \times 10^{-3}$ | $I_1$ | $1.586 \times 10^{-9}$ | $K_1$ | $-1.518 \times 10^{-10}$ |
|  | $C_2$ | $-3.996 \times 10^{-5}$ | $I_2$ | $4.333 \times 10^{-11}$ | $K_2$ | $8.414 \times 10^{-12}$ |
|  | $C_3$ | $-2.734 \times 10^{-6}$ | $I_3$ | $1.181 \times 10^{-12}$ | $K_3$ | $-1.136 \times 10^{-13}$ |
|  | $C_4$ | $2.895 \times 10^{-7}$ | $I_4$ | $-1.160 \times 10^{-13}$ | $K_4$ | $8.051 \times 10^{-15}$ |
|  | $C_5$ | $4.709 \times 10^{-9}$ | $I_5$ | $-2.455 \times 10^{-15}$ | $K_5$ | $2.852 \times 10^{-16}$ |
|  | $C_6$ | $-2.764 \times 10^{-10}$ | $I_6$ | $1.208 \times 10^{-16}$ | $K_6$ | $-1.096 \times 10^{-17}$ |
|  | $C_7$ | $-2.204 \times 10^{-12}$ | $I_7$ | $1.113 \times 10^{-18}$ | $K_7$ | $-1.576 \times 10^{-19}$ |
|  | $C_8$ | $1.077 \times 10^{-13}$ | $I_8$ | $-4.926 \times 10^{-20}$ | $K_8$ | $4.653 \times 10^{-21}$ |
|  | $C_9$ | $4.557 \times 10^{-16}$ | $I_9$ | $-2.163 \times 10^{-22}$ | $K_9$ | $4.037 \times 10^{-23}$ |
|  | $C_{10}$ | $-2.004 \times 10^{-1}$ | $I_{10}$ | $9.416 \times 10^{-24}$ | $K_{10}$ | $-9.619 \times 10^{-25}$ |
|  | $C_{11}$ | $-4.392 \times 10^{-20}$ | $I_{11}$ | $1.929 \times 10^{-26}$ | $K_{11}$ | $-5.541 \times 10^{-27}$ |
|  | $C_{12}$ | $1.790 \times 10^{-21}$ | $I_{12}$ | $-8.632 \times 10^{-28}$ | $K_{12}$ | $1.027 \times 10^{-28}$ |
|  | $C_{13}$ | $1.616 \times 10^{-24}$ | $I_{13}$ | $-6.515 \times 10^{-31}$ | $K_{13}$ | $3.782 \times 10^{-31}$ |
|  | $C_{14}$ | $-6.192 \times 10^{-26}$ | $I_{14}$ | $3.059 \times 10^{-32}$ | $K_{14}$ | $-5.255 \times 10^{-33}$ |
|  | $C_{15}$ | 0 | $I_{15}$ | 0 | $K_{15}$ | $-1.068 \times 10^{-35}$ |
|  | $C_{16}$ | 0 | $I_{16}$ | 0 | $K_{16}$ | $9.556 \times 10^{-38}$ |

Making reference to FIG. 6, the shape of each sub-non-arc surface will now be described.

In the above-described equation (1), the first and second terms of the right side express 'a shape in the main scanning directions', and the third and fourth terms express 'a shape in the sub-scanning directions'. The sub-non-arc surface 'a' shown in FIG. 6 is of the shape of the third term of the equation (1), and represents a quadric surface. When a diameter of a beam spot on the order of 30 μm is attempted to be achieved, there is a case where wavefront aberration cannot be corrected only by the above-mentioned third term, and a diameter of a beam spot cannot be reduced satisfactory. In such a case, by adding the fourth term, $f_{SAG}(Y, Z)$, of the equation (1), as the 'high-order correction amount', the wavefront aberration can be well corrected, and a small diameter of a beam spot can be achieved. The sub-non-arc surface 'b' shown in FIG. 6 is the shape resulting from the above-mentioned fourth term is added to the above-mentioned third term, and Δ is the high-order correction amount expressed by $f_{SAG}(Y, Z)$.

Figure 6:
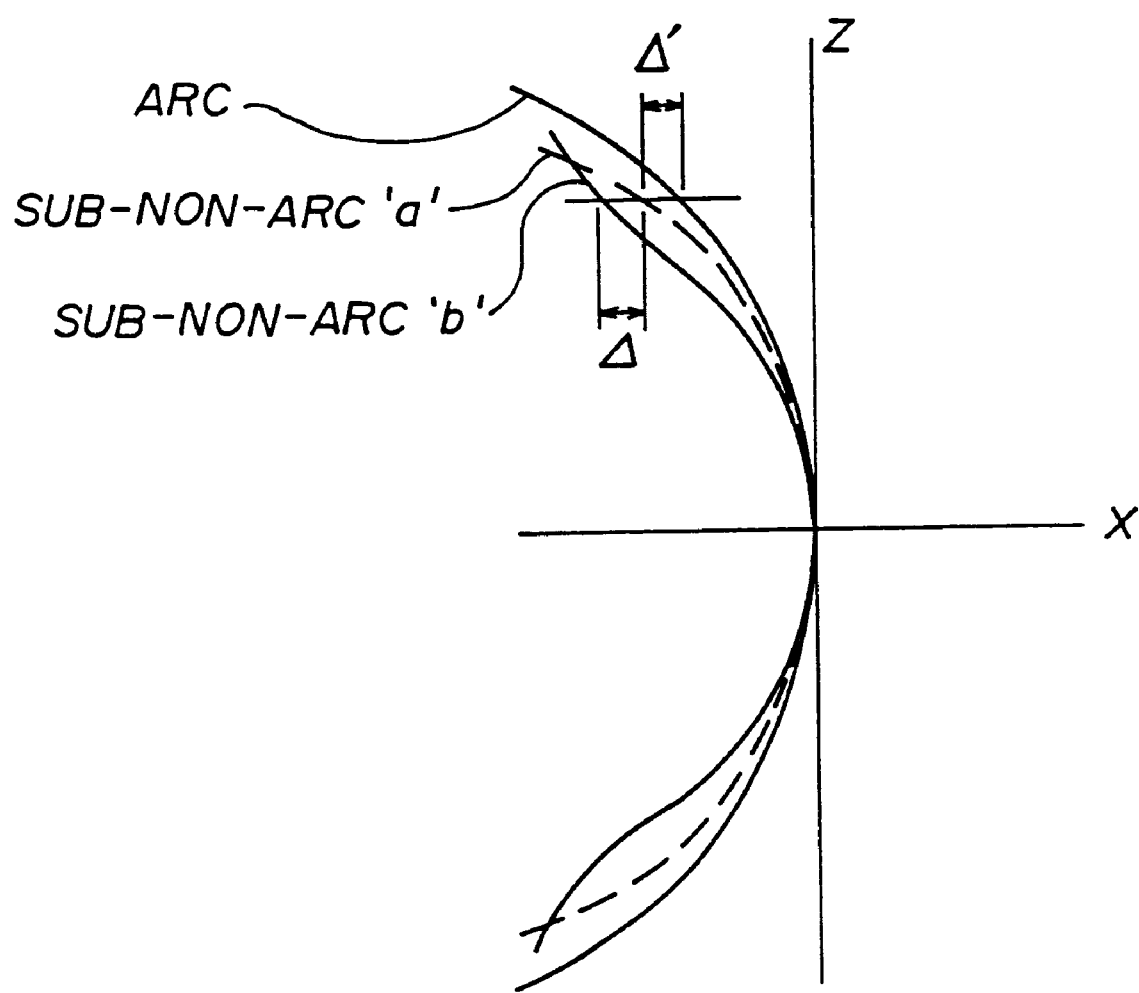
FIG. 6 illustrates a shape of a sub-non-arc surface.

It is also possible to shape the lens(es) in a manner such that the non-arc amount (Δ+Δ') shown in FIG. 6 is fixed regardless of the coordinate Y.

FIGS. 2A and 2B show 'depth curves' when 'a beam spot having a $1/e^2$ diameter on the order of 30 μm' is targeted on the surface 7 to be scanned for reducing the diameter of the beam spot in the above-described first embodiment. FIG. 2A shows those for the main scanning directions, and FIG. 2B shows those for the sub-scanning directions. By shaping the lens(es) so as to cause the lens(es) to have the surface(s) such that the shape(s) in each of the main scanning directions and sub-scanning directions is (are) non-arc, it is possible to obtain satisfactory focal depths.

Figure 3:
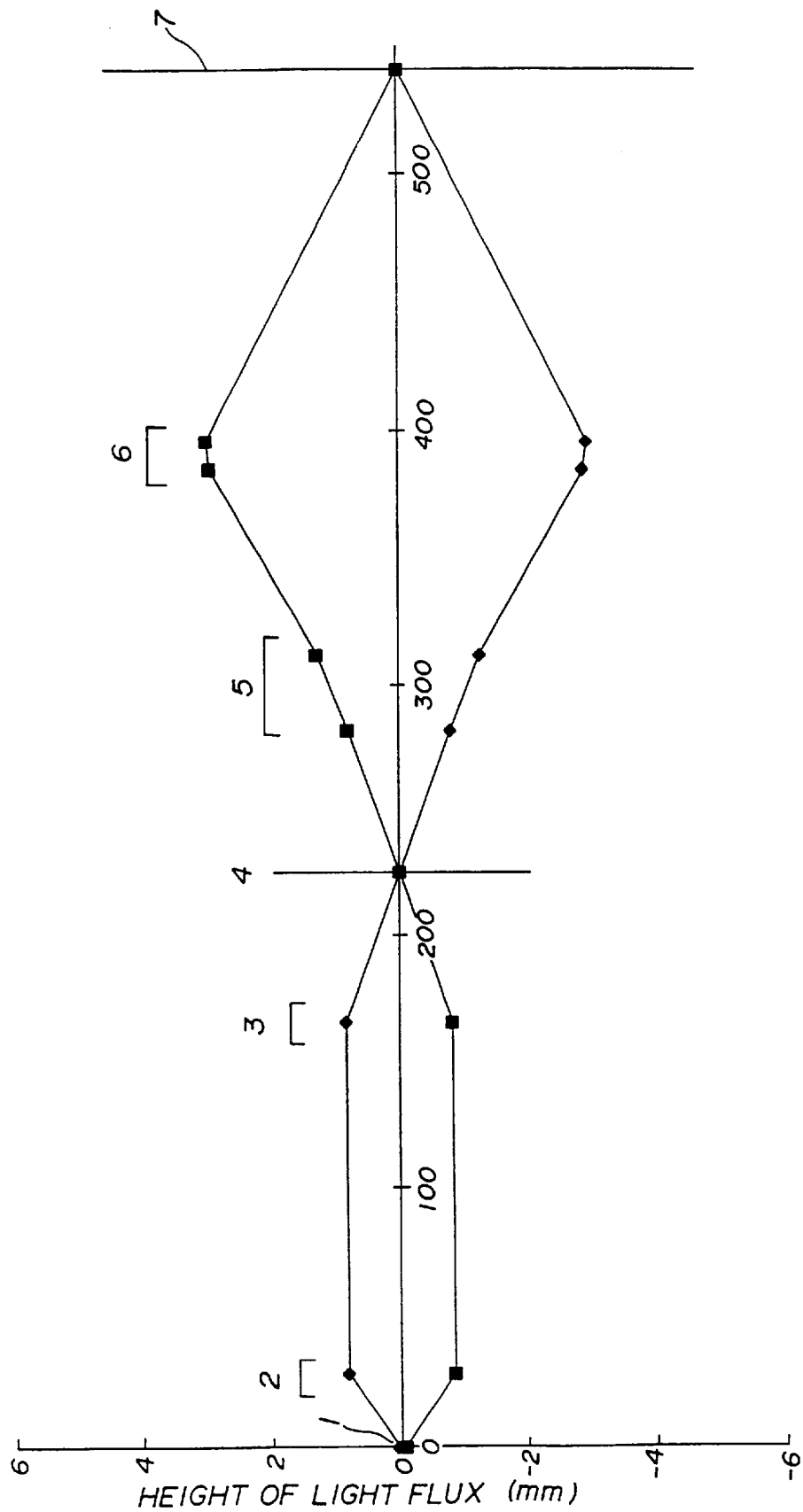
FIG. 3 shows change in a diameter of a light flux in the sub-scanning directions along a light path in the first embodiment.

FIG. 3 shows change in the 'width of the light flux in the sub-scanning directions (light flux directed to the position of the image height of 0)' along the light path in the first embodiment. The width of the light flux is largest on the lens 6. Accordingly, by shaping the surface(s) of the lens 6 into the sub-non-arc surface(s), it is possible to effectively correct wavefront aberration and to obtain a small diameter of a beam spot. The above-mentioned width in the sub-scanning directions is largest on the light-emitting-side surface (6b) of the lens 6. Accordingly, by shaping the surface 6b of the lens 6 into the sub-non-arc surface, it is possible to effectively utilize the function of correcting wavefront aberration of the sub-non-arc surface.

As shown in FIG. 1, the lens 6 also has 'the largest effective diameter' in the main scanning plane, and the surface 6b thereof is a surface on which the above-mentioned effective diameter is largest. Accordingly, by shaping the surface 6b of the lens 6, which surface has the largest effective diameter in the main scanning plane, into the sub-non-arc surface, it is possible to effectively correct wavefront aberration and to obtain a small diameter of a beam spot.

Figure 4:
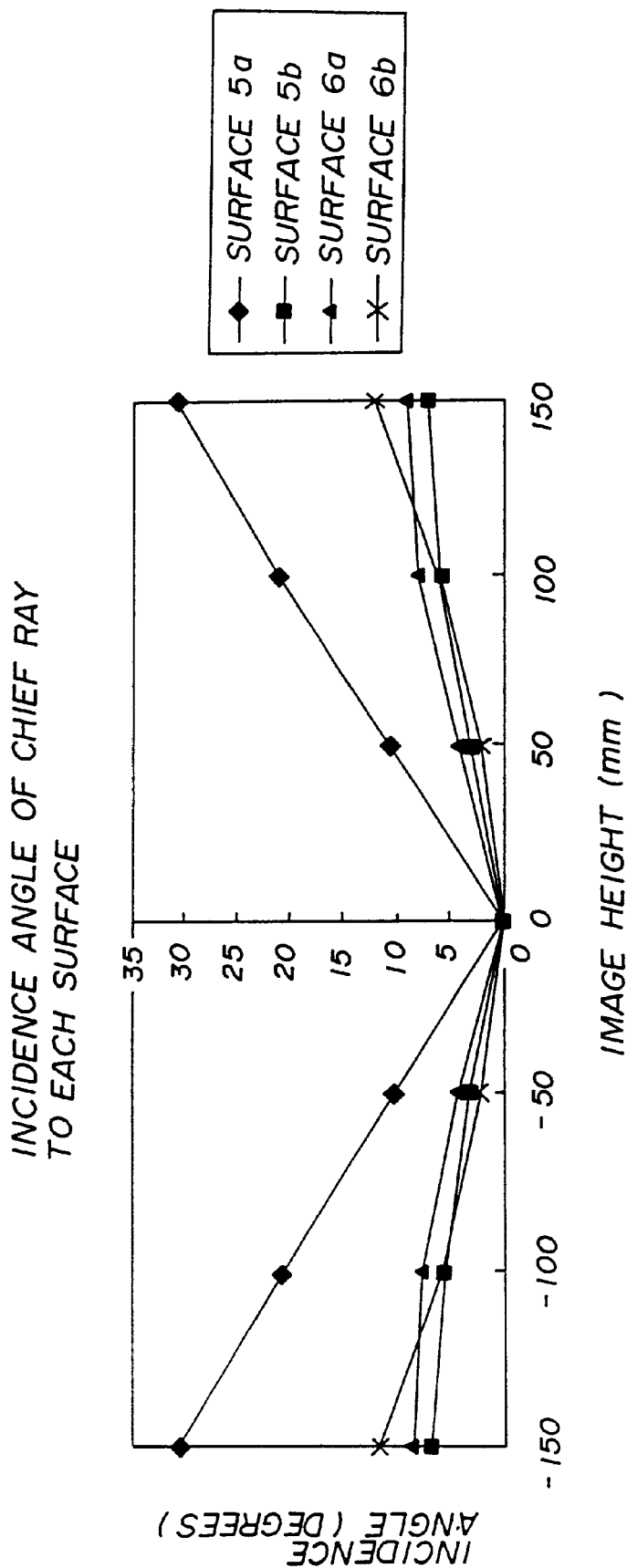
FIG. 4 shows change in an incidence angle onto each surface of lenses in the first embodiment.

FIG. 4 shows 'a relationship between the incidence angle and image height' of the chief ray of the deflected light flux incident on each surface of the lenses 5 and 6. For the surface 5a, each of the incidence angles exceeds 30 degrees for the peripheral image heights. However, for the surfaces 5b, 6a and 6b, each of the incidence angles is equal to or smaller than 25 degrees throughout the effective image range. By shaping the surface(s) of the lens(es), for which surface(s) each incidence angle is equal to or smaller than 25 degrees, into the sub-non-arc surface(s), it is possible to effectively correct wavefront aberration and to obtain a small diameter of a beam spot.

As shown in Tables 1 through 3, as can be seen from the fact that each of the odd-number-order coefficients $A_1$, $A_3$, ... and so forth in the equation (5) is 0, the shape on the main scanning plane of each of the lenses 5 and 6 is symmetrical about the optical axis. Further, each of the surfaces 5b and 6a of the lenses 5 and 6 is such that the sub-scanning curvature varies asymmetrically along the main scanning direction. The surface 6b of the lens 6 is the 'sub-non-arc surface'. The surface 6b of the lens 6 which is the sub-non-arc surface has, as shown in Table 3, the sub-non-arc amount Δ' (determined by $C_0, C_1, C_2, \ldots$, and so forth), and, also, has the sub-non-arc amount Δ (determined by $I_0, I_1, \ldots, K_0, K_1, \ldots$, and so forth) by $f_{SAG}(Y, Z)$. That is, in the first embodiment, all the coefficients of $f_{SAG}(Y, Z)$ other than those shown in Table 3 are 0. As a result, $$f_{SAG}(Y, Z) = (I_0 + I_1 \cdot Y + I_2 \cdot Y^2 + I_3 \cdot Y^3 + I_4 \cdot Y^4 + \ldots + I_{16} \cdot Y^{16}) \cdot Z^4 + (K_0 + K_1 \cdot Y + K_2 \cdot Y^2 + K_3 \cdot Y^3 + K_4 \cdot Y^4 + \ldots + K_{16} \cdot Y^{16}) \cdot Z^6$$

Figure 5A:
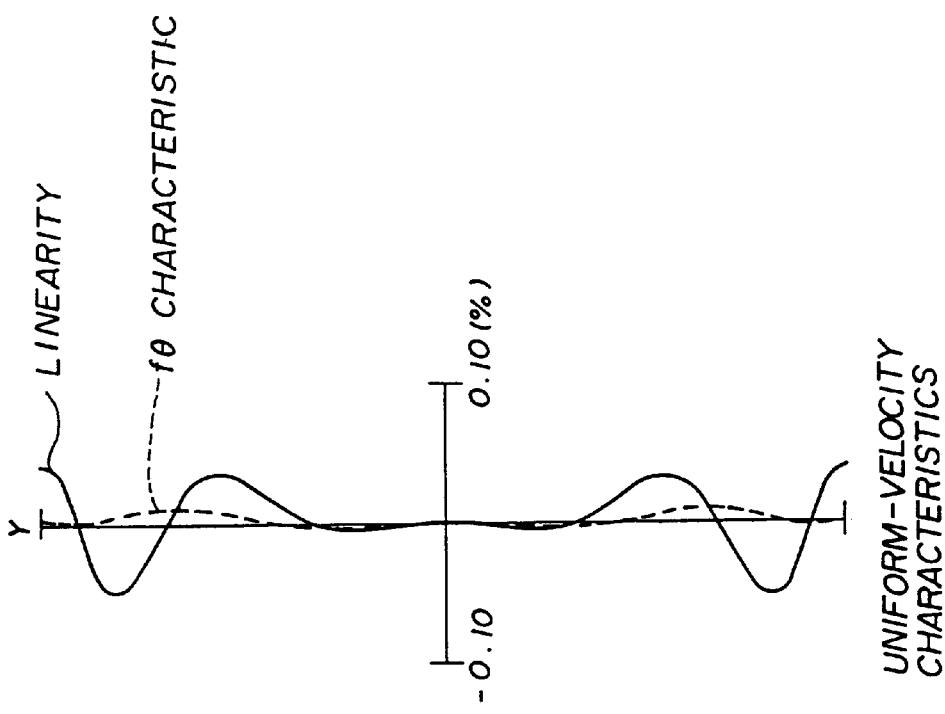
FIGS. 5 and 5B show image-surface curvatures and uniform-velocity characteristics in the first embodiment.
Figure 5B:
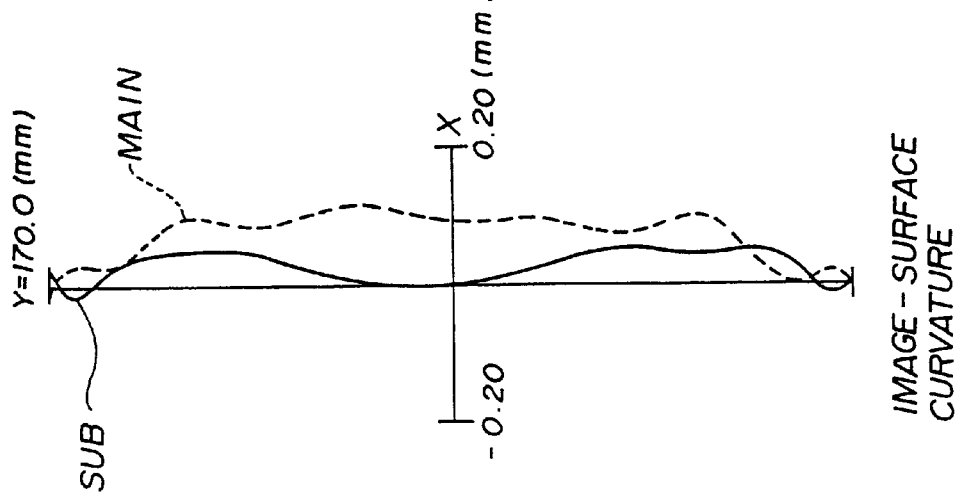

FIG. 5A shows image-surface curvatures (in the sub-scanning directions by a solid line and in the main-scanning directions by a broken line), and FIG. 5B shows uniform-velocity characteristics (linearity by a solid line and fθ characteristic by a broken line) of the first embodiment. These characteristics are extremely satisfactory.

The second embodiment will now be described.

In FIG. 7, data of the optical components on the optical path from the polygon mirror 4 to the surface 7 to be scanned is as follows:

| | SURFACE NUMBER | R m (mm) | R s (mm) | X (mm) | Y (mm) | n |
|---|---|---|---|---|---|---|
| DEFLECTION REFLECTIVE SURFACE | 0 | ∞ | ∞ | 72.56 (D6) | | |
| LENS 8 | 1 | 1616.43 | −50.14 | 35.00 (D7) | 0.406 | 1.52398 |
| | 2 | −146.51 | −199.81 | 61.93 (D8) | | |
| LENS 9 | 3 | 400.87 | −72.03 | 14.00 (D9) | 0.403 | 1.52398 |
| | 4 | 824.88 | −27.59 | 158.52 (D10) | | |

The surface numbers 1, 2, 3 and 4 correspond to the surfaces 8a, 8b, 9a and 9b of the lenses 8 and 9 shown in FIG. 7, respectively, 'X' denotes an interval indicated as D6 through D10 in FIG. 7, 'Y' denotes a shift amount of the lens (from a reference line regarding the projection onto the main scanning plane of the chief ray of each light flux reflected by the deflection reflective surface in the direction toward the point on the surface 7 to be scanned at which the image height (H) is 0 as the reference line and the upper side in FIG. 7 as positive, accordingly it being able to be seen from the above data that each of the lenses 8 and 9 is shifted upward in FIG. 7), and 'n' denote the refractive index of the lens. In order to specify the shapes of the surfaces of the lenses 8 and 9, the respective coefficients are shown in Tables 4 through 6.

TABLE 4

| SURFACE NUMBER | | COEFFICIENT FOR MAIN SCANNING DIRECTIONS | | COEFFICIENT FOR SUB-SCANNING DIRECTIONS |
|---|---|---|---|---|
| 1 | K | $1.976 \times 10^{+2}$ | $B_1$ | $-1.162 \times 10^{-5}$ |
| | $A_1$ | 0 | $B_2$ | $2.276 \times 10^{-6}$ |
| | $A_2$ | 0 | $B_3$ | $2.714 \times 10^{-9}$ |
| | $A_3$ | 0 | $B_4$ | $-1.544 \times 10^{-10}$ |
| | $A_4$ | $1.281 \times 10^{-8}$ | $B_5$ | $-4.265 \times 10^{-13}$ |
| | $A_5$ | 0 | $B_6$ | $6.417 \times 10^{-15}$ |
| | $A_6$ | $-6.374 \times 10^{-13}$ | $B_7$ | $9.179 \times 10^{-19}$ |
| | $A_7$ | 0 | $B_8$ | $-1.230 \times 10^{-19}$ |
| | $A_8$ | $-9.428 \times 10^{-17}$ | $B_9$ | $1.453 \times 10^{-20}$ |
| | $A_9$ | 0 | $B_{10}$ | $-1.881 \times 10^{-22}$ |
| | $A_{10}$ | $5.965 \times 10^{-21}$ | $B_{11}$ | $-1.468 \times 10^{-24}$ |
| | $A_{11}$ | 0 | $B_{12}$ | $-2.670 \times 10^{-26}$ |

TABLE 4-continued

| SURFACE NUMBER | | COEFFICIENT FOR MAIN SCANNING DIRECTIONS | | COEFFICIENT FOR SUB-SCANNING DIRECTIONS |
|---|---|---|---|---|
| 2 | K | $-1.857 \times 10^{-1}$ | $B_1$ | 0 |
| | $A_1$ | 0 | $B_2$ | $-2.125 \times 10^{-6}$ |
| | $A_2$ | 0 | $B_3$ | 0 |
| | $A_3$ | 0 | $B_4$ | $1.805 \times 10^{-11}$ |
| | $A_4$ | $1.774 \times 10^{-8}$ | $B_5$ | 0 |
| | $A_5$ | 0 | $B_6$ | $2.716 \times 10^{-14}$ |
| | $A_6$ | $1.384 \times 10^{-13}$ | $B_7$ | 0 |
| | $A_7$ | 0 | $B_8$ | $6.924 \times 10^{-19}$ |
| | $A_8$ | $-4.354 \times 10^{-17}$ | $B_9$ | 0 |
| | $A_9$ | 0 | $B_{10}$ | $-2.685 \times 10^{-22}$ |
| | $A_{10}$ | $7.168 \times 10^{-21}$ | $B_{11}$ | 0 |
| | $A_{11}$ | 0 | $B_{12}$ | $-5.778 \times 10^{-26}$ |

TABLE 5

| SURFACE NUMBER | | COEFFICIENT FOR MAIN SCANNING DIRECTIONS | | COEFFICIENT FOR SUB-SCANNING DIRECTIONS |
|---|---|---|---|---|
| 3 | K | −12.60 | $B_1$ | 0 |
| | $A_1$ | 0 | $B_2$ | $-1.962 \times 10^{-7}$ |
| | $A_2$ | 0 | $B_3$ | 0 |
| | $A_3$ | 0 | $B_4$ | $2.230 \times 10^{-11}$ |
| | $A_4$ | $-7.349 \times 10^{-9}$ | $B_5$ | 0 |
| | $A_5$ | 0 | $B_6$ | $-1.022 \times 10^{-15}$ |
| | $A_6$ | $-2.106 \times 10^{-13}$ | $B_7$ | 0 |
| | $A_7$ | 0 | $B_8$ | $1.081 \times 10^{-20}$ |
| | $A_8$ | $8.173 \times 10^{-18}$ | $B_9$ | 0 |
| | $A_9$ | 0 | $B_{10}$ | $6.363 \times 10^{-25}$ |
| | $A_{10}$ | $5.409 \times 10^{-22}$ | $B_{11}$ | 0 |
| | $A_{11}$ | 0 | $B_{12}$ | $-3.645 \times 10^{-29}$ |
| | $A_{12}$ | $-1.082 \times 10^{-25}$ | $B_{13}$ | 0 |
| | $A_{13}$ | 0 | $B_{14}$ | 0 |
| | $A_{14}$ | $-2.039 \times 10^{-32}$ | $B_{15}$ | 0 |
| 4 | K | −71.068 | $B_1$ | $-8.546 \times 10^{-7}$ |
| | $A_1$ | 0 | $B_2$ | $4.161 \times 10^{-7}$ |
| | $A_2$ | 0 | $B_3$ | $-2.523 \times 10^{-11}$ |
| | $A_3$ | 0 | $B_4$ | $-2.960 \times 10^{-11}$ |
| | $A_4$ | $-1.324 \times 10^{-8}$ | $B_5$ | $2.114 \times 10^{-16}$ |
| | $A_5$ | 0 | $B_6$ | $1.160 \times 10^{-15}$ |
| | $A_6$ | $9.662 \times 10^{-14}$ | $B_7$ | $4.372 \times 10^{-22}$ |
| | $A_7$ | 0 | $B_8$ | $-1.098 \times 10^{-21}$ |
| | $A_8$ | $1.888 \times 10^{-17}$ | $B_9$ | $5.560 \times 10^{-24}$ |
| | $A_9$ | 0 | $B_{10}$ | $-7.785 \times 10^{-25}$ |
| | $A_{10}$ | $-3.102 \times 10^{-22}$ | $B_{11}$ | $-1.617 \times 10^{-29}$ |
| | $A_{11}$ | 0 | $B_{12}$ | $3.262 \times 10^{-30}$ |
| | $A_{12}$ | $7.298 \times 10^{-27}$ | $B_{13}$ | 0 |
| | $A_{13}$ | 0 | $B_{14}$ | 0 |
| | $A_{14}$ | $2.305 \times 10^{-32}$ | $B_{15}$ | 0 |

TABLE 6

| 4 | | | | | |
|---|---|---|---|---|---|
| | $C_0$ | $-3.940 \times 10^{-1}$ | $I_0$ | $2.869 \times 10^{-6}$ | $K_0$ | $-1.526 \times 10^{-9}$ |
| | $C_1$ | $1.796 \times 10^{-4}$ | $I_1$ | $4.012 \times 10^{-11}$ | $K_1$ | $-3.101 \times 10^{-11}$ |
| | $C_2$ | $2.425 \times 10^{-6}$ | $I_2$ | $1.690 \times 10^{-11}$ | $K_2$ | $-8.903 \times 10^{-12}$ |
| | $C_3$ | $4.438 \times 10^{-8}$ | $I_3$ | $3.572 \times 10^{-14}$ | $K_3$ | $5.017 \times 10^{-14}$ |
| | $C_4$ | $4.584 \times 10^{-10}$ | $I_4$ | $-8.742 \times 10^{-15}$ | $K_4$ | $3.241 \times 10^{-15}$ |
| | $C_5$ | $-2.438 \times 10^{-12}$ | $I_5$ | $1.964 \times 10^{-18}$ | $K_5$ | $-7.703 \times 10^{-18}$ |
| | $C_6$ | $-3.396 \times 10^{-14}$ | $I_6$ | $8.603 \times 10^{-19}$ | $K_6$ | $-4.104 \times 10^{-19}$ |
| | $C_7$ | $4.132 \times 10^{-17}$ | $I_7$ | $6.160 \times 10^{-23}$ | $K_7$ | $5.118 \times 10^{-22}$ |
| | $C_8$ | $6.805 \times 10^{-19}$ | $I_8$ | $-3.347 \times 10^{-23}$ | $K_8$ | $2.368 \times 10^{-23}$ |
| | $C_9$ | 0 | $I_9$ | $-3.693 \times 10^{-29}$ | $K_9$ | $-1.550 \times 10^{-26}$ |
| | $C_{10}$ | 0 | $I_{10}$ | $4.53553 \times 10^{-28}$ | $K_{10}$ | $-6.371 \times 10^{-28}$ |
| | $C_{11}$ | 0 | $I_{11}$ | 0 | $K_{11}$ | $1.748 \times 10^{-31}$ |
| | $C_{12}$ | 0 | $I_{12}$ | 0 | $K_{12}$ | $6.503 \times 10^{-33}$ |

Figure 11A:
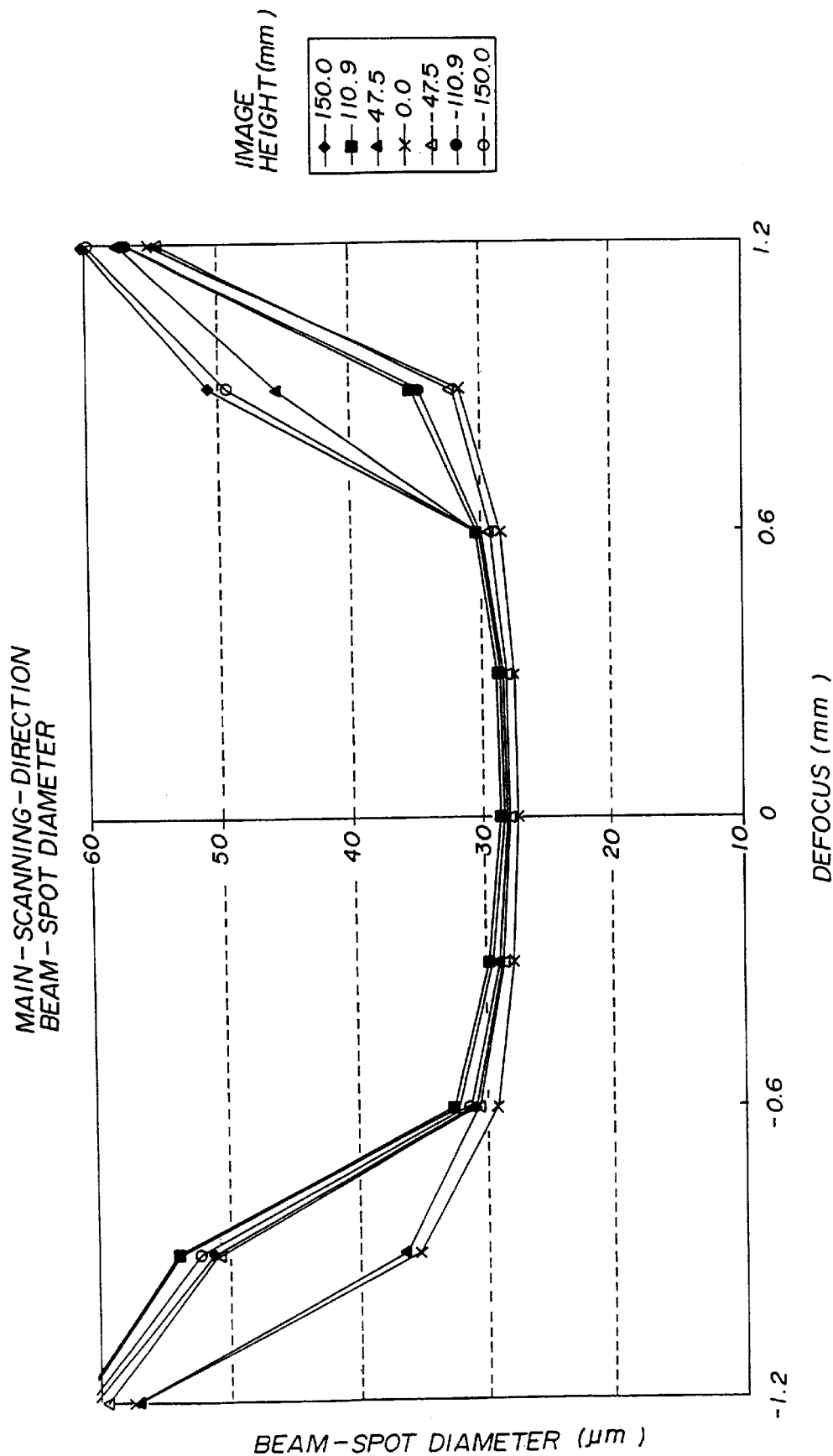
FIGS. 11A and 11B show depth curves in the second embodiment.
Figure 11B:
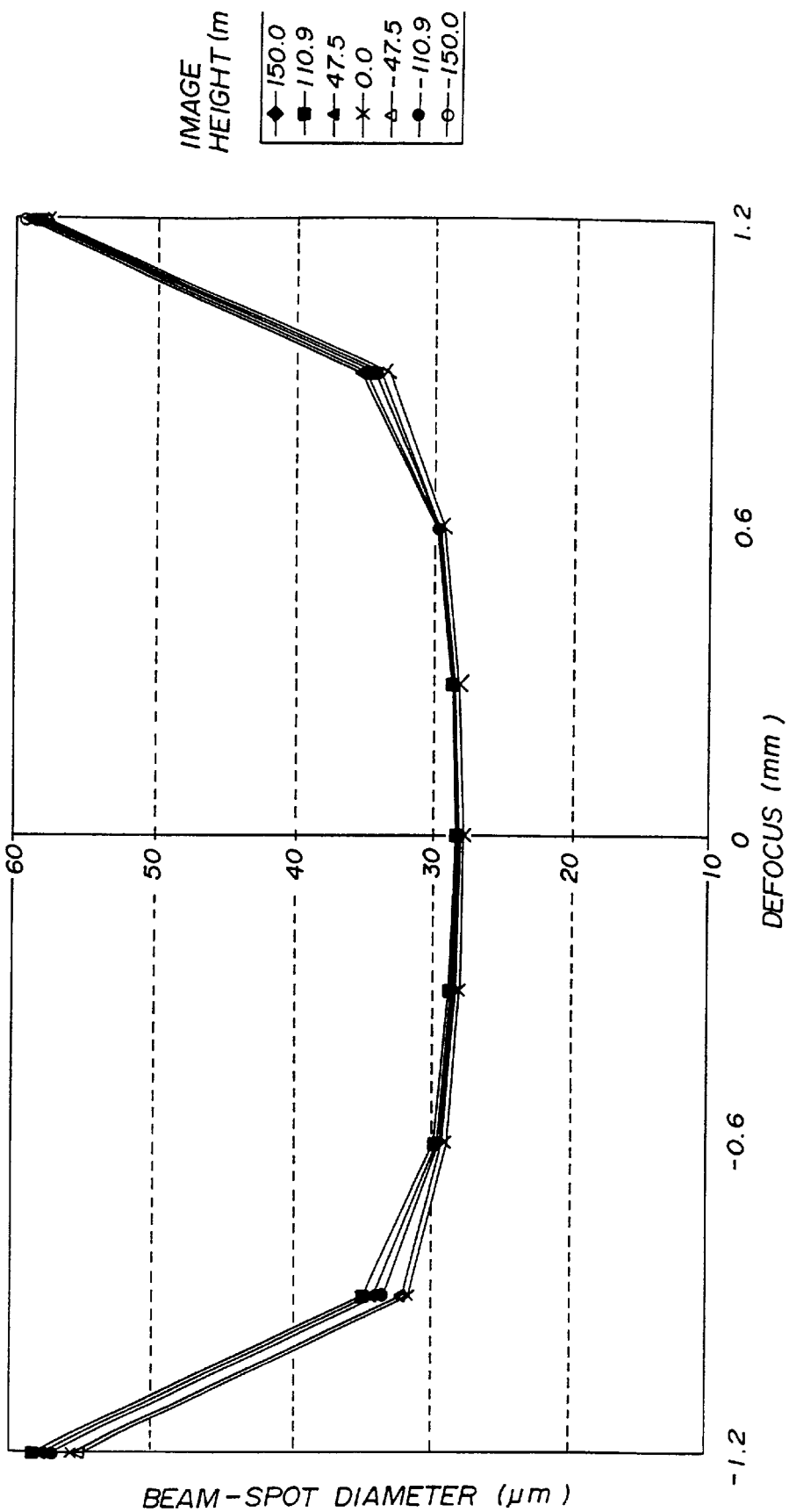

FIGS. 11A and 11B show 'depth curves' when 'a beam spot having a $1/e^2$ diameter on the order of 30 $\mu$m' is targeted on the surface to be scanned for reducing the diameter of the beam spot in the second embodiment. FIG. 11A shows those for the main scanning directions, and FIG. 11B shows those for the sub-scanning directions. By shaping the lenses so as to cause the lenses to have the surface(s) such that the shape(s) in each of the main scanning directions and sub-scanning directions is (are) non-arc, it is possible to obtain satisfactory focal depths.

FIG. 9 shows change in the 'width of the light flux in the sub-scanning directions (light flux directed to the position of the image height of 0)' in the second embodiment. The width of the light flux is largest on the lens 9. Accordingly, by shaping the surface(s) of the lens 9 into the sub-non-arc surface(s), it is possible to effectively correct wavefront aberration and to obtain a small diameter of a beam spot. The above-mentioned width in the sub-scanning directions is largest on the light-emitting-side surface (9b) of the lens 9. Accordingly, by shaping the surface 9b of the lens 9 into the sub-non-arc surface, it is possible to effectively utilize the function of correcting wavefront aberration of the sub-non-arc surface.

As shown in FIG. 7, the lens 9 also has 'the largest effective diameter' in the main scanning plane, and the surface 9b thereof is a surface on which the above-mentioned effective diameter is largest. Accordingly, by shaping the surface(s) of the lens 9, in particular, the surface 9b of the lens 9, which surface has the largest effective diameter in the main scanning plane, into the sub-non-arc surface(s), it is possible to effectively correct wavefront aberration and to obtain a small diameter of a beam spot.

Figure 10:
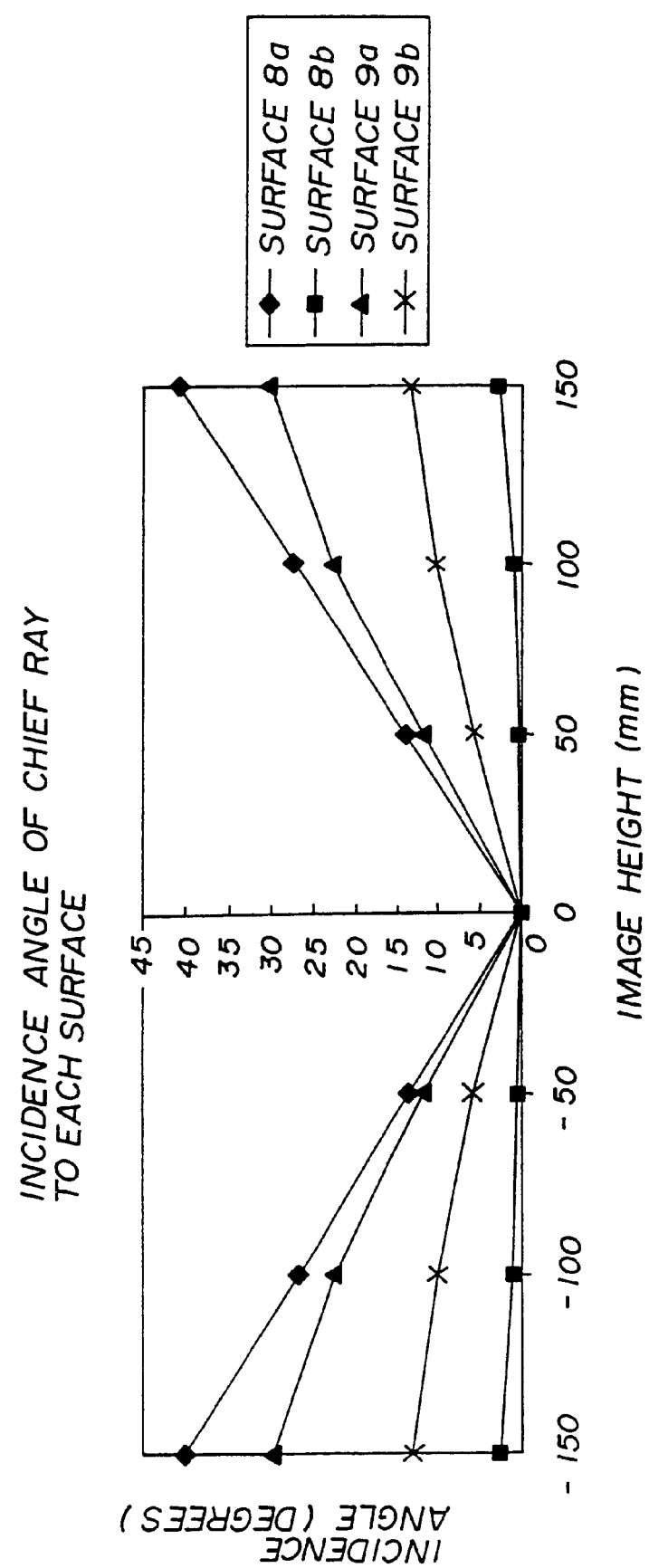
FIG. 10 shows change in an incidence angle onto each surface of lenses in the second embodiment.

FIG. 10 shows 'a relationship between the incidence angle and image height' of the chief ray of the deflected light flux incident on each surface of the lenses 8 and 9. For the surfaces 8a and 8b, each of the incidence angles exceeds 30 degrees for the peripheral image heights. However, for the surfaces 9a and 9b, each of the incidence angles is equal to or smaller than 25 degrees throughout the effective image range. By shaping the surface(s) of the lens(es), for which surface(s) each incidence angle is equal to or smaller than 25 degrees, into the sub-non-arc surface(s), it is possible to effectively correct wavefront aberration and a to obtain a small diameter of a beam spot.

As shown in Table 4 through 6, as can be seen from the fact that each of the odd-number-order coefficients $A_1$, $A_3$, ... and so forth in the equation (5) is 0, the shape on the main scanning plane of each of the lenses 8 and 9 is symmetrical about the optical axis. Further, each of the surfaces 8a and 9b of the lenses 8 and 9 is such that the sub-scanning curvature varies asymmetrically along the main scanning direction. The surface 9b of the lens 9 is the 'sub-non-arc surface'. The surface 9b of the lens 9 which is the sub-non-arc surface has, as shown in Table 6, the sub-non-arc amount $\Delta'$ (determined by $C_0$, $C_1$, $C_2$, ..., and so forth), and, also, has the sub-non-arc amount $\Delta$ (determined by $I_0$, $I_1$, ..., $K_0$, $K_1$, ..., and so forth) by $f_{SAG}(Y, Z)$. That is, also in the second embodiment, all the coefficients of $f_{SAG}(Y, Z)$ other than those shown in Table 6 are 0. As a result, $$f_{SAG}(Y, Z) = (I_0 + I_1 \cdot Y + I_2 \cdot Y^2 + I_3 \cdot Y^3 + I_4 \cdot Y^4 + \ldots + I_{12} \cdot Y^{12}) \cdot Z^4 + (K_0 + K_1 \cdot Y + K_2 \cdot Y^2 + K_3 \cdot Y^3 + K_4 \cdot Y_4 \ldots + K_{12} \cdot Y^{12}) \cdot Z^6$$

Figure 8B:
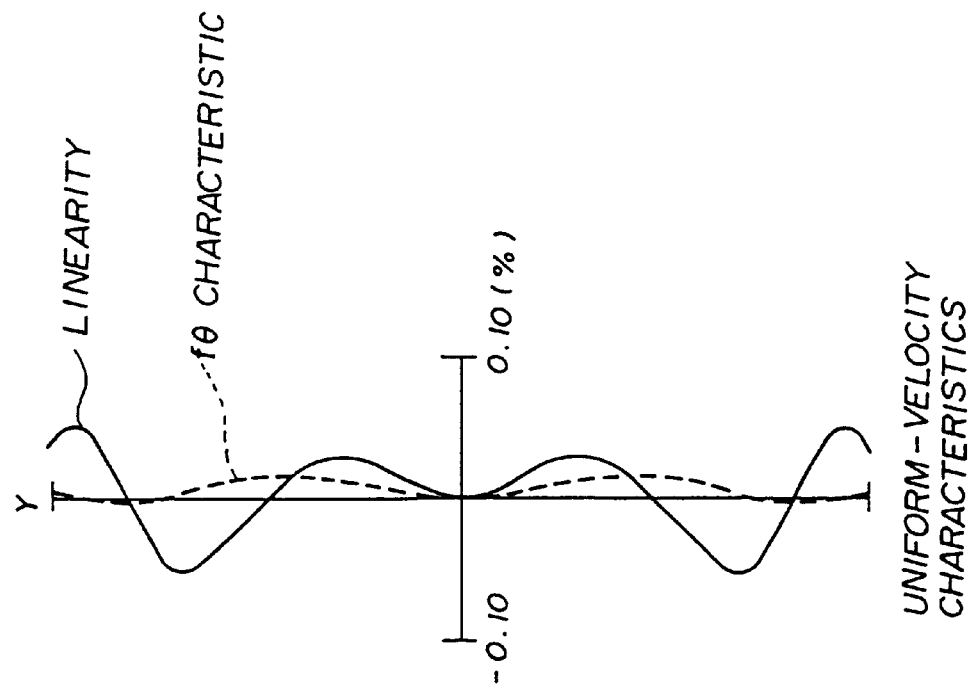
FIGS. 8A and 8B show image-surface curvatures and uniform-velocity characteristics in the second embodiment.
Figure 8A:
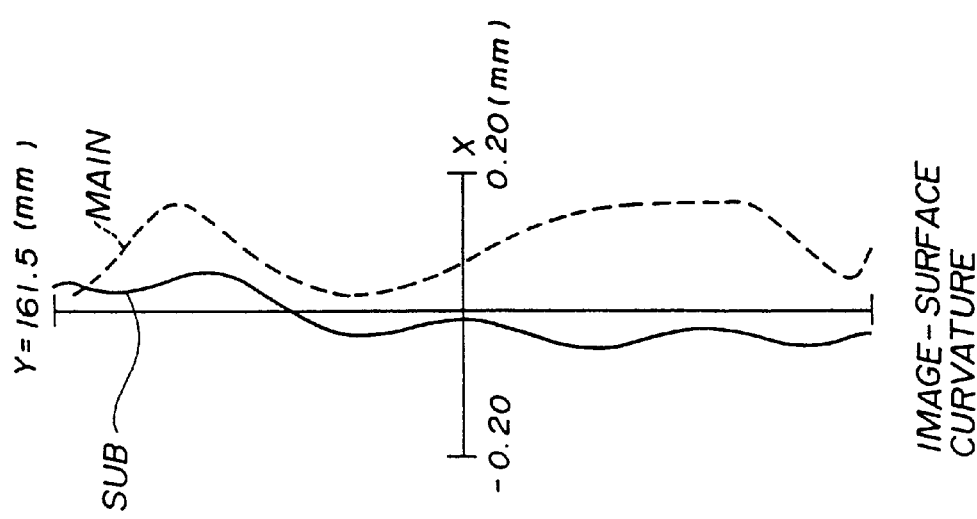

FIG. 8A shows image-surface curvatures (in the sub-scanning directions by a solid line and in the main-scanning directions by a broken line), and FIG. 8B shows uniform-velocity characteristics (linearity by a solid line and f$\theta$ characteristic by a broken line) of the second embodiment. These characteristics are extremely satisfactory.

As described above, in each of the first and second embodiments, the light source 1 is the semiconductor laser array having the four light-emitting sources, for example. The interval between each adjacent light-emitting sources of the four light-emitting sources is 14 $\mu$m, and the four light-emitting sources are arranged in the sub-scanning directions in a manner such that the four light-emitting sources are symmetrical about the optical axis of the coupling lens 2. Accordingly, two of the four light-emitting sources are arranged, at positions 7 $\mu$m away from the above-mentioned optical axis, and the other two thereof are arranged at positions 21 $\mu$m away from the above-mentioned optical axis.

The characteristics shown in FIGS. 2A through 5B and FIGS. 8A through 11B are those for the light flux emitted from 'the light-emitting source of the above-mentioned four light-emitting sources at the position 21 $\mu$m away from the optical axis of the coupling lens 2'. However, both the first and second embodiments are designed in a manner such that wavefront aberrations, image-surface curvatures, optical magnifications, uniform-velocity characteristics and so forth be well corrected for all the four light fluxes emitted from the respective four light-emitting sources. Accordingly, 'depth curves' shown in FIGS. 2A and 2B and FIGS. 11A and 11B, and 'image-surface curvatures and uniform-velocity characteristics' shown in FIGS. 5A and 5B and FIGS. 8A and 8B are substantially the same as those shown in these figures for all the four light fluxes.

In summary, each of the above-described first and second embodiments is a device which deflects one or plurality of light flux(es) originating from the light source 1 by the optical deflecting unit 4, gathers the deflected light flux(es) to cause it(them) to form a beam spot(s) on the surface 7 to be scanned by the scanning and image-forming optical system 5, 6 (8, 9), and, thus, performs optical scanning of the surface 7 to be scanned. The scanning and image-forming optical system 5, 6 (8, 9) includes one or a plurality of optical component(s) including lenses 5, 6 (8, 9). Further, at least one surface of the lens included in the scanning and image-forming optical system is the sub-non-arc surface which is a surface having an arc or non-arc shape in the main scanning plane, and having a non-arc shape in the sub-scanning plane. The sub-non-arc surface is formed in the lens 6 (9) in which the diameter of the light flux passing through the scanning and image-forming optical system is largest in the sub-scanning plane.

Specifically, the surface 6b (9b) of the lens 6 (9), in which surface the diameter of the light flux passing through the scanning and image-forming optical system is largest in the sub-scanning plane, is the sub-non-arc surface. Further, the sub-non-arc surface is formed in the lens 6 (9) having the largest effective diameter in the main scanning plane. Specifically, the surface 6b (9b) of the lens 6 (9), which surface has the largest effective diameter in the main scanning plane, is the sub-non-arc surface. Further, the sub-non-arc surface(s) is(are) formed in the lens(es) of the scanning and image-forming optical system having the surface(s) in (each of) which, throughout the effective range of the lens, the incidence angle of the chief ray of the deflected light flux incident on the respective surfaces of the lens is equal to or less than 25 degrees. Specifically, in this (these) lens(es), the surface(s), in (each of) which the incidence angle of the chief ray of the deflected light flux is equal to or less than 25 degrees throughout the effective range of the lens, is (are) shaped into the sub-non-arc surface(s).

Further, the shape of (each of) the sub-non-arc surface(s) is expressed by a coordinate X(Y, Z) in the optical-axis direction and is expressed by the following equation:

$$X(Y, Z) = CmY^2/[1+\sqrt{\{1-(1+K)Cm^2Y^2\}}] + \Sigma A_n Y^n + Cs(Y)Z^2/[1+\sqrt{\{1-(1+Kz(Y))Cs^2(Y)Z^2\}}] + f_{SAG}(Y, Z) \quad (1)$$

where 'Y' denotes the coordinate in the main scanning direction, 'Z' denotes the coordinate in the sub-scanning direction, 'Cm' denotes a paraxial curvature in the main scanning directions on the optical axis or in the vicinity thereof, 'Cs(0)' denotes a paraxial curvature in the sub-scanning directions on the optical axis or in the vicinity thereof, 'Cs(Y)' denotes a curvature in the sub-scanning plane at a coordinate Y in the main scanning direction, 'K' denotes a conical constant of a quadric curve in the main scanning plane on the optical axis, 'Kz(Y)' denotes a conical constant of a quadric curve in the sub-scanning plane at a coordinate Y in the main scanning direction, and '$f_{SAG}$(Y, Z)' denotes a non-spherical-surface high-order correction amount. The sum of the second term is taken for n from n=1 to n=p (desired order number). The above-mentioned curvature Cs(Y) can be expressed by the following equation:

$$Cs(Y) = \{1/Rs(0)\} + B_1Y + B_2Y^2 + B_3Y^3 + B_4Y^4 + \ldots \quad (2)$$

using a radius Rs(0) of paraxial curvature in the sub-scanning plane on the optical axis or in the vicinity thereof, and constant coefficients $B_1$, $B_2$, $B_3$, . . . . The above-mentioned conical constant Kz(Y) can be expressed by the following equation:

$$Kz(Y) = C_0 + C_1Y + C_2Y^2 + C_3Y^3 + C_4Y^4 + \ldots \quad (3)$$

using constant coefficients $C_0$, $C_1$, $C_2$, $C_3$, . . . . The above-mentioned high-order correction amount $f_{SAG}$(Y, Z) can be expressed by the following equation $$f_{SAG}(Y, Z) = \Sigma(\Sigma d_{j,h}Y^h)Z^j \quad (4)$$

using constant coefficients $d_{j,h}$. The sum of the right side is taken for h from h=0 to h=q (desired order), and for J, j=1 to j=r (desired order).

In each of the above-mentioned first and second embodiments, the optical deflecting unit 4 is the unit (polygon mirror) which deflects the light flux(es) originating from the light source 1 at the uniform angular velocity, and the scanning and image-forming optical system 5, 6 (8, 9) has the function of making the velocity of optical scanning by the light flux(es) deflected at the uniform angular velocity be uniform (see the uniform-velocity characteristics shown in FIGS. 5B and 8B). Further, each of the lenses 5, 6, 8 and 9 is made of a plastic material. Further, the optical scanning device in each of the first and second embodiments is the multi-beam-scanning system, for example, in which the plurality of light fluxes are emitted from the light source 1, are gathered to form the plurality of beam spots on the surface 7 to be scanned by the scanning and image-forming optical system, a plurality of scan lines on the surface 7 to be scanned are scanned simultaneously by the plurality of beam spots. Further, the optical scanning device of the multi-beam-scanning system in each embodiment is configured to couple the plurality of (four) light fluxes from the light source 1 by the coupling lens 2, cause the thus-obtained light fluxes to form line images each extending in the main scanning directions on the deflection reflective surface of the optical deflecting unit 4 or in the vicinity thereof by the line-image forming optical system 3 common to the respective light fluxes, then reflect and deflect the light fluxes at the uniform angular velocity by the optical deflecting unit 4, gather the reflected and deflected light fluxes so as to cause them to form the plurality of beam spots separate in the sub-scanning directions, and scan the plurality of scan lines on the surface 7 to be scanned simultaneously using the plurality of beam spots, by the common scanning and image-forming optical system 5, 6 (8, 9).

A monolithic semiconductor laser array in which the plurality of light-emitting sources are arranged in a line is used as the light source 1 which emits the plurality of light fluxes.

Further, each of the first and second embodiments may also be used as an optical scanning device of the above-described single-beam scanning system. In this case, as mentioned above, the light source having the single light-emitting source is used as the light source 1, instead of the above-mentioned light source having the plurality of light-emitting sources. Also in this case, the optical scanning devices of the single-beam scanning system according to the present invention have constructions the same as those shown in FIGS. 1 and 7.

Making reference to FIG. 12, an embodiment of an image forming apparatus will now be described.

This image forming apparatus is a laser printer.

The laser printer 100 has a 'cylindrical photoconductive photosensitive body' as an image carrying body 111. Around the image carrying body 111, a charging roller 112 as a charging unit, a developing unit 113, a transfer roller 114 and a cleaning unit 115 are arranged. It is possible to use a 'corona charger' as the charging unit. Further, an optical scanning device 117 is provided, which performs 'exposure by optical writing using a laser beam LB' between the charging roller 112 and developing unit 113.

The optical scanning device 117 is such as the above-mentioned first or second embodiment.

Figure 12:
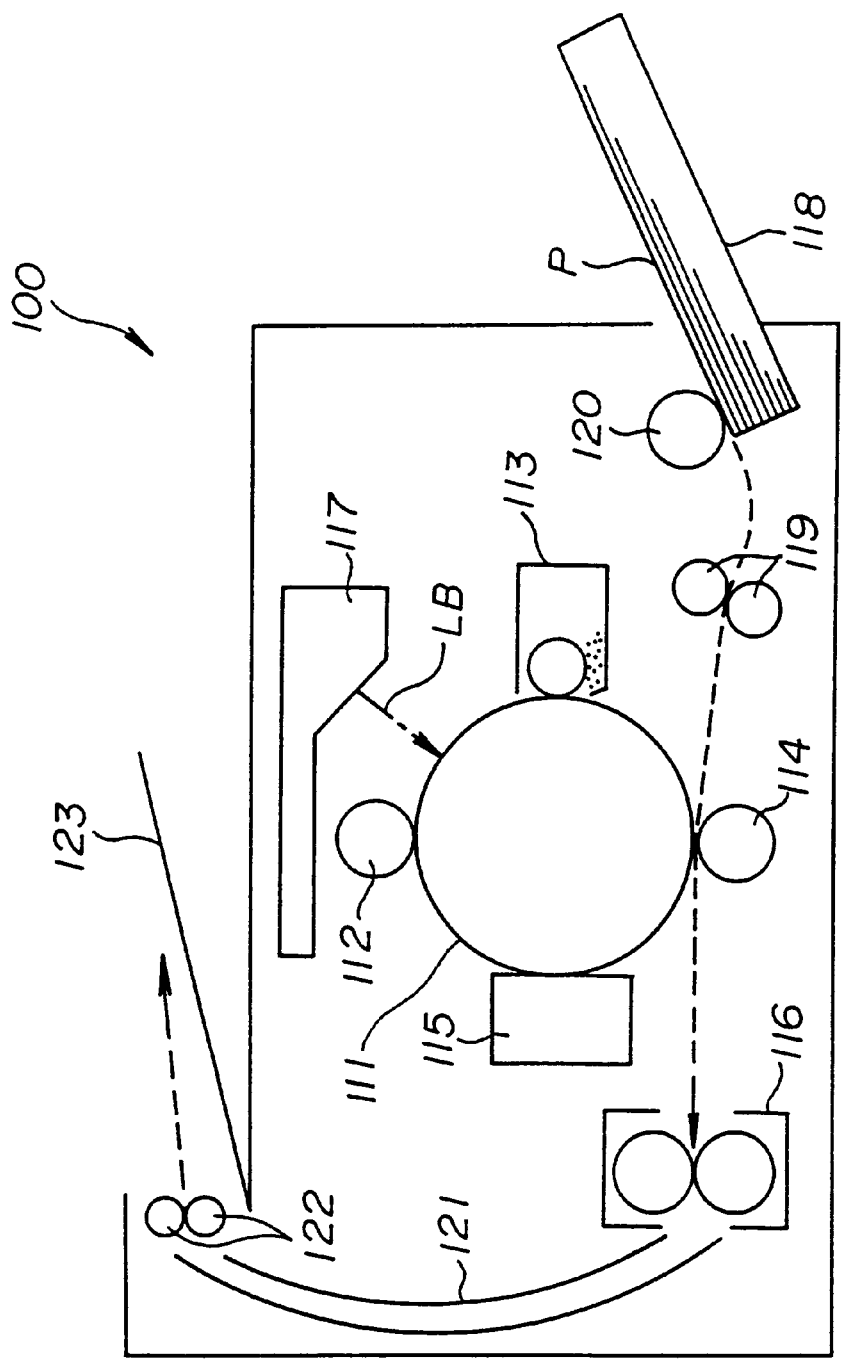
FIG. 12 is a schematic drawing illustrating one embodiment of an image forming apparatus according to the present invention.

Further, as shown in FIG. 12, a fixing unit 116, a cassette 118, a pair of registration rollers 119, a paper feeding roller 120, a conveyance path 121, a pair of paper ejecting rollers 122, and a tray 123 are provided. In the tray 123, transfer paper P as recording media is contained.

When a printed image is formed, the image carrying body 111 which is the photoconductive photosensitive body is rotated at a uniform velocity clockwise, a surface thereof is charged uniformly by the charging roller 112, and an electrostatic latent image is formed thereon by exposure through optical writing using the laser beam performed by the optical scanning device 117. The thus-formed electrostatic latent image is a so-called 'negative latent image' and in which an image portion is exposed.

The electrostatic latent image is developed by the developing unit 113 so that a toner image (positive image) is formed on the image carrying body 111.

The cassette 118 containing the transfer paper P is detachable from a body of the laser printer 100, and, in a condition in which the cassette 118 is attached to the body as shown in the figure, a top sheet of the transfer paper contained thereby is fed by the paper feeding roller 120. The thus-fed transfer-paper sheet is taken by the pair of the registration rollers 119 at the front end thereof. The pair of registration rollers 119 feed the transfer-paper sheet to the transfer roller 114 at a time at which the toner image on the image carrying body 111 moves to the transfer roller 114 due to rotation of the carrying body 111. The thus-fed transfer-paper sheet P is laid on the toner image at the transfer roller 114 and, by a function of the transfer roller 114, the toner image is electrostatically transferred onto the transfer-paper sheet.

The transfer-paper sheet P having the toner image transferred thereonto has the toner image fixed thereonto by the fixing unit 116, then, passes through the conveyance path 121, and is ejected onto the tray 123 by the pair of paper ejecting rollers 122. After the toner image is transferred to the transfer-paper sheet, the surface of the image carrying body 111 is cleaned by the cleaning unit 115, and, thus, residual toner, paper powder and so forth are removed therefrom.

By employing such a device as the first or second embodiment as the optical scanning device 117, it is possible to perform image formation satisfactorily.

Thus, the image forming apparatus shown in FIG. 12 is an apparatus in which a latent image is formed on the latent-image carrying body 111 by optical scanning, the thus-formed latent image is developed, and, thereby, a desired image is obtained. In the image forming apparatus, as the optical scanning device 117 for performing the optical scanning of the latent-image carrying body 111, any of the above-mentioned optical scanning devices in the first and second embodiments is used. The image forming apparatus is such that the photoconductive photosensitive body is used as the latent-image carrying body 111, a formed latent image is visualized as a toner image, the toner image is transferred and fixed onto the sheet-like recording medium P.

When the optical scanning device according to the present invention is of the multi-beam scanning system, the coupling lens may be common to the plurality of light fluxes as in the above-described embodiments, but, alternatively, a coupling lens may be provided for each light flux individually.

The present invention is not limited to the above-described embodiments, and variations and modifications may be made without departing from the scope of the present invention.

The present application is based on Japanese priority application No.11-196448, filed on Jul. 9, 1999, the entire contents of which are hereby incorporated by reference.

What is claimed is:

1. An optical scanning device which deflects one or a plurality of light flux(es) originating from a light source by an optical deflecting unit, gathers the deflected light flux(es) to cause it (them) to form a beam spot(s) on a surface to be scanned by a scanning and image-forming optical system, and, thus, performs optical scanning of said surface to be scanned,
wherein:
said scanning and image-forming optical system includes one or a plurality of optical component(s) including a lens(es);
at least one surface of a lens included in said scanning and image-forming optical system is a sub-non-arc surface having an arc or non-arc shape in a main scanning plane, and a non-arc shape in a sub-scanning plane; and
said sub-non-arc surface has no rotational axis and is formed in the lens in which a diameter of the deflected light flux passing through said scanning and image-forming optical system is largest in the sub-scanning plane.

2. The optical scanning device as claimed in claim 1, wherein the surface of the lens, in which surface a diameter of the deflected light flux passing through said scanning and image-forming optical system is largest in the sub-scanning plane, is the sub-non-arc surface.

3. The optical scanning device as claimed in claim 1, wherein:
said optical deflecting unit deflects the light flux(es) originating from said light source at a uniform angular velocity;
said scanning and image-forming optical system has a function of making a velocity of optical scanning by the light flux(es) deflected at the uniform angular velocity be uniform.

4. The optical scanning device as claimed in claim 1, wherein the lens of said scanning and image-forming optical system having the sub-non-arc surface is made of a plastic material.

5. The optical scanning device as claimed in claim 1, wherein said device is of a multi-beam-scanning system in which a plurality of light fluxes are emitted from said light source, are gathered to form a plurality of beam spots on said surface to be scanned by said scanning and image-forming optical system, a plurality of scan lines on said surface to be scanned are scanned simultaneously by the plurality of beam spots.

6. The optical scanning device as claimed in claim 5, wherein the plurality of light fluxes from said light source are coupled by a coupling lens, then, the thus-obtained light fluxes form line images each extending in the main scanning directions on a deflection reflective surface of said optical deflecting unit or in the vicinity thereof by a line-image forming optical system common to the respective light fluxes, then the light fluxes are reflected and deflected at a uniform angular velocity by said optical deflecting unit, are then gathered so as to cause them to form the plurality of beam spots separate in the-sub-scanning directions, and the plurality of beam spots scan the plurality of scan lines on said surface to be scanned simultaneously.

7. The optical scanning device as claimed in claim 5, wherein said light source which emits the plurality of light fluxes comprises a monolithic semiconductor laser array in which a plurality of light-emitting sources are arranged in a line.

8. The optical scanning device as claimed in claim 1, wherein said device is of a:single-beam-scanning system in which a single light flux is emitted from said light source, is gathered to form a beam spot on said surface to be scanned by said scanning and image-forming optical system, a single scan line on said surface to be scanned is scanned by the beam spot at each scanning.

9. An image forming apparatus in which a latent image is formed on a latent-image carrying body by optical scanning, the thus-formed latent image is developed, and, thereby, a desired image is obtained,
wherein an optical scanning device for performing the optical scanning of the latent-image carrying body comprises the optical scanning device claimed in claim 1.

10. The image forming apparatus as claimed in claim 9, wherein said latent-image carrying body comprises a photoconductive photosensitive body, a formed latent image is visualized as a toner image, the toner image is transferred and fixed onto a sheet-like recording medium.

11. An optical scanning device which deflects one or a plurality of light flux(es) originating from a light source by an optical deflecting unit, gathers the deflected light flux(es) to cause it (them) to form a beam spot(s) on a surface to be scanned by a scanning and image-forming optical system, and, thus, performs optical scanning of said surface to be scanned, wherein:
said scanning and image-forming optical system includes one or a plurality of optical component(s) including a lens(es);
at least one surface of a lens included in said scanning and image-forming optical system is a sub-non-arc surface having an arc or non-arc shape in a main scanning plane, and a non-arc shape in a sub-scanning plane; and
the sub-non-arc surface has no rotational axis and is formed in the lens having a largest effective diameter in the main scanning plane.

12. The optical scanning device as claimed in claim 11, wherein the surface of the lens, which surface has a largest effective diameter in the main scanning plane, is the sub-non-arc surface.

13. The optical scanning device as claimed in claim 11, wherein:
said optical deflecting unit deflects the light flux(es) originating from said light source at a uniform angular velocity;
said scanning and image-forming optical system has a function of making a velocity of optical scanning by the light flux(es) deflected at the uniform angular velocity be uniform.

14. The optical scanning device as claimed in claim 11, wherein the lens of said scanning and image-forming optical system having the sub-non-arc surface is made of a plastic material.

15. The optical scanning device as claimed in claim 11, wherein said device is of a multi-beam-scanning system in which a plurality of light fluxes are emitted from said light source, are gathered to form a plurality of beam spots on said surface to be scanned by said scanning and image-forming optical system, a plurality of scan lines on said surface to be scanned are scanned simultaneously by the plurality of beam spots.

16. The optical scanning device as claimed in claim 15, wherein the plurality of light fluxes from said light source are coupled by a coupling lens, then, the thus-obtained light fluxes form line images each extending in the main scanning directions on a deflection reflective surface of said optical dreflecting unit or in the vicinity thereof by a line-image forming optical system common to the respective light fluxes, then the light fluxes are reflected and deflected at a uniform angular velocity by said optical deflecting unit, are then gathered so as to cause them to form the plurality of beam spots separate in the sub-scanning directions, and the plurality of beam spots scan the plurality of scan lines on said surface to be scanned simultaneously.

17. The optical scanning device as claimed in claim 15, wherein said light source which emits the plurality of light fluxes comprises a monolithic semiconductor laser array in which a plurality of light-emitting sources are arranged in a line.

18. The optical scanning device as claimed in claim 11, wherein said device is of a single-beam-scanning system in which a single light flux is emitted from said light source, is gathered to form a beam spot on said surface to be scanned by said scanning and image-forming optical system, a single scan line on said surface to be scanned is scanned by the beam spot at each scanning.

19. An image forming apparatus in which a latent image is formed on a latent-image carrying body by optical scanning, the thus-formed latent image is developed, and, thereby, a desired image is obtained,
wherein an optical scanning device for performing the optical scanning of the latent-image carrying body comprises the optical scanning device claimed in claim 11.

20. The image forming apparatus as claimed in claim 19, wherein said latent-image carrying body comprises a photoconductive photosensitive body, a formed latent image is visualized as a toner image, the toner image is transferred and fixed onto a sheet-like recording medium.

21. An optical scanning device which deflects one or a plurality of light flux(es) originating from a light source by an optical deflecting unit, gathers the deflected light flux(es) to cause it (them) to form a beam spot(s) on a surface to be scanned by a scanning and image-forming optical system, and, thus, performs optical scanning of said surface to be scanned, wherein:
said scanning and image-forming optical system includes one or a plurality of optical component(s) including a lens(es);
at least one surface of a lens included in said scanning and image-forming optical system is a sub-non-arc surface having an arc or non-arc shape in a main scanning plane, and a non-arc shape in a sub-scanning plane; and
the sub-non-arc surface has no rotational axis and is formed in the lens of said scanning and image-forming optical system, which lens has a surface in which, throughout an effective range of said lens, an incidence angle of a chief ray of the defected light flux incident on respective surfaces of said lens is equal to or smaller than 25 degrees.

22. The optical scanning device as claimed in claim 21, wherein the surface of the lens of said scanning and image-forming optical system, in which surface an incidence angle of the chief ray of the deflected light flux incident on respective surfaces of said lens is equal to or smaller than 25 degrees throughout the effective range of said lens, comprises the sub-non-arc surface.

23. The optical scanning device as claimed in claim 21, wherein:
said optical deflecting unit deflects the light flux(es) originating from said light source at a uniform angular velocity;
said scanning and image-forming optical system has a function of making a velocity of optical scanning by the light flux(es) deflected at the uniform angular velocity be uniform.

24. The optical scanning device as claimed in claim 21, wherein the lens of said scanning and image-forming optical system having the sub-non-arc surface is made of a plastic material.

25. The optical scanning device as claimed in claim 21, wherein said device is of a multi-beam-scanning system in which a plurality of light fluxes are emitted from said light source, are gathered to form a plurality of beam spots on said surface to be scanned by said scanning and image-forming optical system, a plurality of scan lines on said surface to be scanned are scanned simultaneously by the plurality of beam spots.

26. The optical scanning device as claimed in claim 25, wherein said light source which emits the plurality of light fluxes comprises a monolithic semiconductor laser array in which a plurality of light-emitting sources are arranged in a line.

27. The optical scanning device as claimed in claim 25, wherein the plurality of light fluxes from said light source are coupled by a coupling lens, then, the thus-obtained light fluxes form line images each extending in the main scanning directions on a deflection reflective surface of said optical deflecting unit or in the vicinity thereof by a line-image forming optical system common to the respective light fluxes, then the light fluxes are reflected and deflected at a uniform angular velocity by said optical deflecting unit, are then gathered so as to cause them to form the plurality of beam spots separate in the sub-scanning directions, and the plurality of beam spots scan the plurality of scan lines on said surface to be scanned simultaneously.

28. The optical scanning device as claimed in claim 21, wherein said device is of a single-beam-scanning system in which a single light flux is emitted from said light source, is gathered to form a beam spot on said surface to be scanned by said scanning and image-forming optical system, a single scan line on said surface to be scanned is scanned by the beam spot at each scanning.

29. An image forming apparatus in which a latent image is formed on a latent-image carrying body by optical scanning, the thus-formed latent image is developed, and, thereby, a desired image is obtained, wherein an optical scanning device for performing the optical scanning of the latent-image carrying body comprises the optical scanning device claimed in claim 21.

30. The image forming apparatus as claimed in claim 29, wherein said latent-image carrying body comprises a photoconductive photosensitive body, a formed latent image is visualized as a toner image, the toner image is transferred and fixed onto a sheet-like recording medium.

31. An optical scanning device which deflects one or a plurality of light flux(es) originating from a light source by an optical deflecting unit, gathers the deflected light flux(es) to cause it(them) to form a beam spot(s) on a surface to be scanned by a scanning and image-forming optical system, and, thus, performs optical scanning of said surface to be scanned, wherein:
said scanning and image-forming optical system includes one or a plurality of optical component(s) including a lens(es);
at least one surface of a lens included in said scanning and image-forming optical system is a sub-non-arc surface having an arc or non-arc shape in a main scanning plane, and a non-arc shape in a sub-scanning plane; and
the sub-non-arc surface expressed by a coordinate X(Y, Z) in an optical-axis direction is expressed by the following equation:

$$X(Y, Z) = CmY^2/[1+\sqrt{1-(1+K)Cm^2Y^2}] + \Sigma A_n Y^n$$
$$+ Cs(Y)Z^2/[1+\sqrt{1-(1+Kz(Y))Cs^2(Y)Z^2}] + f_{SAG}(Y, Z) \quad (1)$$

where 'Y' denotes a coordinate in a main scanning direction, 'Z' denotes a coordinate in a sub-scanning direction, 'Cm' denotes a paraxial curvature in the main scanning directions on the optical axis or in the vicinity thereof, 'Cs(0)' denotes a paraxial curvature in the sub-scanning directions on the optical axis or in the vicinity thereof, 'Cs(Y)' denotes a curvature in the sub-scanning plane at a coordinate Y in the main scanning direction, 'K' denotes a conical constant of a quadric curve in the main scanning plane on the optical axis, 'Kz(Y)' denotes a conical constant of quadric curve in the sub-scanning plane at a coordinate Y in the main scanning direction, and '$f_{SAG}(Y, Z)$' denotes a non-spherical-surface high-order correction amount.

32. The optical scanning device as claimed in claim 31, wherein the curvature Cs(Y) is expressed by the following equation:

$$Cs(Y) = \{1/Rs(0)\} + B_1 Y + B_2 Y^2 + B_3 Y^3 + B_4 Y^4 + \ldots \quad (2)$$

using a radius Rs(0) of paraxial curvature in the sub-scanning plane on the optical axis or in the vicinity thereof, and constant coefficients $B_1$, $B_2$, $B_3$, ....

33. The optical scanning device as claimed in claim 31, wherein the conical constant Kz(Y) is expressed by the following equation:

$$Kz(Y) = C_0 + C_1 Y + C_2 Y^2 + C_3 Y^3 + C_4 Y^4 + \ldots \quad (3)$$

using constant coefficients $C_0$, $C_1$, $C_2$, $C_3$, ....

34. The optical scanning device as claimed in claim 31, wherein
the high-order correction amount $f_{SAG}(Y, Z)$ is expressed by the following equation $$f_{SAG}(Y, Z) = \Sigma(\Sigma d_{j, h} Y^h) Z^j \quad (4)$$

using constant coefficients $d_{j, h}$.

35. The optical scanning device as claimed In claim 31, wherein:
said optical deflecting unit deflects the light flux(es) originating from said light source at a uniform angular velocity;
said scanning and image-forming optical system has a function of making a velocity of optical scanning by the light flux(es) deflected at the uniform angular velocity be uniform.

36. The optical scanning device as claimed in claim 31, wherein the lens of said scanning and image-forming optical system having the sub-non-arc surface is made of a plastic material.

37. The optical scanning device as claimed in claim 31, wherein said device is of a multi-beam-scanning system in which a plurality of light fluxes are emitted from said light source, are gathered to form a plurality of beam spots on said surface to be scanned by said scanning and image-forming optical system, a plurality of scan lines on said surface to be scanned are scanned simultaneously by the plurality of beam spots.

38. The optical scanning device as claimed in claim 37, wherein the plurality of light fluxes from said light source are coupled by a coupling lens, then, the thus-obtained light fluxes form line images each extending in the main scanning directions on a deflection reflective surface of said optical deflecting unit or in the vicinity thereof by a line-image forming optical system common to the respective light fluxes, then the light fluxes are reflected and deflected at a uniform angular velocity by said optical deflecting unit, are then gathered so as to cause them to form the plurality of beam spots separate in the sub-scanning directions, and the plurality of beam spots scan the plurality of scan lines on said surface to be scanned simultaneously.

39. The optical scanning device as claimed in claim 37, wherein said light source which emits the plurality of light fluxes comprises a monolithic semiconductor laser array in which a plurality of light-emitting sources are arranged in a line.

40. The optical scanning device as claimed in claim 31, wherein said device is of a single-beam-scanning system in which a single light flux is emitted from said light source, is gathered to form a beam spot on said surface to be scanned by said scanning and image-forming optical system, a single scan line on said surface to be scanned is scanned by the beam spot at each scanning.

41. An image forming apparatus in which a latent image is formed on a latent-image carrying body by optical scanning, the thus-formed latent image is developed, and, thereby, a desired image is obtained, wherein an optical scanning device for performing the optical scanning of the latent-image carrying body comprises the optical scanning device claimed in claim 31.

42. The image forming apparatus as claimed in claim 41, wherein said latent-image carrying body comprises a photoconductive photosensitive body, a formed latent image is visualized as a toner image, the toner image is transferred and fixed onto a sheet-like recording medium.

* * * * *